(12) United States Patent
Smiljanic et al.

(10) Patent No.: US 10,866,884 B2
(45) Date of Patent: Dec. 15, 2020

(54) STATELESS INJECTED SCRIPT DEBUGGING

(71) Applicant: Oracle International Corporation, Redwood Shores, CA (US)

(72) Inventors: John Richard Smiljanic, Austin, TX (US); Henry John Wagner, Castro Valley, CA (US); Sekhar Chandra Korupolu, Dublin, CA (US); Michael John De Groot, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/713,691

(22) Filed: Dec. 13, 2019

(65) Prior Publication Data

US 2020/0117579 A1 Apr. 16, 2020

Related U.S. Application Data

(63) Continuation of application No. 15/804,841, filed on Nov. 6, 2017, now Pat. No. 10,545,853.

(51) Int. Cl.
  *G06F 9/44* (2018.01)
  *G06F 11/36* (2006.01)
  (Continued)

(52) U.S. Cl.
  CPC .......... *G06F 11/3664* (2013.01); *G06F 11/36* (2013.01)

(58) Field of Classification Search
  CPC ............... G06F 11/3664; G06F 11/362; G06F 11/3636; G06F 11/3624; G06F 11/3644; G06F 11/36; G06F 8/20; G06F 8/71; G06F 8/33; G06F 8/36; G06F 8/34; G06F 11/0709
  See application file for complete search history.

(56) References Cited

U.S. PATENT DOCUMENTS 8,966,448 B2   2/2015 Cooper ................ G06F 11/362
9,239,774 B2   1/2016 Paveza ................ G06F 11/362
(Continued)

OTHER PUBLICATIONS

Blum et al., Stateless model checking with data-race preemption points, 17 pages (Year: 2016).*
(Continued)

*Primary Examiner* — Thuy Dao
(74) *Attorney, Agent, or Firm* — Trellis IP Law Group, PC

(57) ABSTRACT

Debugger requests are for debugging a script injected into a web application during a debug session are received. Each of the debugger requests include the same debug session identifier. A different one of the debugger requests is associated with each of the break points set for debugging the script. For each of the debugger requests: a new stateless debugger node is connected with a single stateless target tester node. Stateless debugger nodes and stateless target tester nodes reside inside of the multi-node cloud system. The script is debugged on the same stateless target tester node while the debugging is controlled from a developer computer system that is outside of the multi-node cloud system. After completion of each of the debugger requests: a current stateless debugger node is disconnected, and state stored in the multi-node cloud system used for servicing a current debugger request is destroyed.

20 Claims, 16 Drawing Sheets

(51) Int. Cl.
  *G06F 17/50*    (2006.01)
  *G06F 9/455*    (2018.01)

(56) References Cited

U.S. PATENT DOCUMENTS

| | | | |
|---|---|---|---|
| 9,244,817 B2 | 1/2016 | Cai | G06F 11/362 |
| 9,436,583 B1* | 9/2016 | Chen | G06F 11/14 |
| 9,588,870 B2 | 3/2017 | Marron | G06F 11/362 |
| 9,645,910 B1 | 5/2017 | Kaila | G06F 11/3624 |
| 9,659,012 B2* | 5/2017 | Thatte | G06F 16/00 |
| 9,760,472 B2* | 9/2017 | Batzdorff | G06F 11/3624 |
| 10,049,028 B2 | 8/2018 | Tucker | G06F 11/3636 |
| 10,496,517 B2* | 12/2019 | Romer | G06F 11/321 |
| 2015/0058823 A1 | 2/2015 | Cai | G06F 11/362 |
| 2015/0058824 A1 | 2/2015 | Smiljanic | G06F 11/3636 |
| 2018/0165177 A1 | 6/2018 | Gupta | G06F 11/3664 |

OTHER PUBLICATIONS

Li et al., BLOCK: a black-box approach for detection of state violation attacks towards web applications, 10 pages [Year: 2011].

* cited by examiner

FIGURE 4

[Screenshot of Script Debugger interface with labels 301, 401 (Script Debuggable tab), 410, 420, 135, 430, 440 (Stack), 450 (Variables), 451, 460 (Breakpoints/Log), 133]

Code shown (420):
```
1 if (OpportunityAmount<500){
2     return true;
3 }
4 return false;
5
```

Stack (440):

| Object Name | Type | Field Name | Name | Line |
|---|---|---|---|---|
| Debuggable | Validation Rule | | isOpportunityValid | 4 |

Variables (450):

| Name | Value | Type |
|---|---|---|
| Source | ViewRow [Oracle.jbo.Key... | Object |
| Id | 300000008803465 | String |
| RowType | "Debuggable" | String |
| RecordName | "BM" | String |
| CreatedBy | "weblogic" | Object |
| CreationDate | 2017-06-30 11:26:02.0 | String |
| LastUpdatedBy | "weblogic" | Object |
| LastUpdateDate | 2017-06-30 11:26:03.0 | Object |
| ObjectVersionNumber | null | null |
| OpportunityAmount | 100000 | Object |

Breakpoints (460):

| Actions | Line | Object Name | Type | Field Name | Name |
|---|---|---|---|---|---|
| X | 1 | Debuggable | Validation Rule | | sessiondef.hosta |
| X | 2 | Debuggable | Validation Rule | | sessiondef.hosta |
| X | 4 | Debuggable | Validation Rule | | sessiondef.hosta |

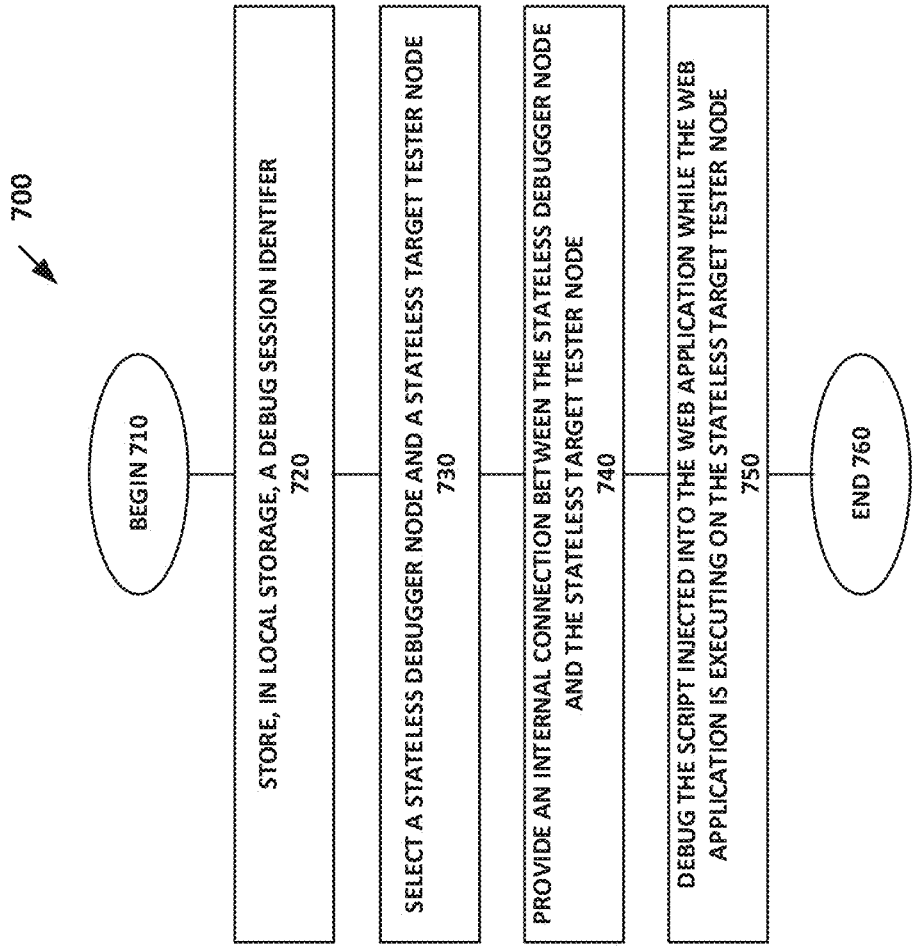

STATELESS INJECTED SCRIPT DEBUGGING

CROSS REFERENCES TO RELATED APPLICATIONS

This application is a continuation of the following application, U.S. patent application Ser. No. 15/804,841, entitled STATELESS DEBUGGING OF A SCRIPT INJECTED INTO A WEB APPLICATION THAT IS LOCATED IN A MULTI-NODE CLOUD SYSTEM, filed on Nov. 6, 2017, which is hereby incorporated by reference as if set forth in full in this application for all purposes.

This application is related to the following U.S. Pat. No. 9,122,794, entitled "System and Method for Debugging Domain Specific Language", issued on Sep. 1, 2015, which is hereby incorporated by reference, as if set forth in full in this application for all purposes.

This application is related to the following, U.S. Pat. No. 9,183,113, entitled "Debugging Analysis in Running Multi-User Systems", issued on Nov. 10, 2015, and U.S. Pat. No. 9,514,026, entitled "Debugging Analysis in Running Multi-User Systems", issued on Dec. 6, 2016, both of which is hereby incorporated by reference, as if set forth in full in this application for all purposes.

BACKGROUND

Increasingly, developers are being given the ability to develop their own custom software through cloud computing systems. A developer can write code, compile and execute the code in a debugging mode. The debugging mode allows the developer a window into how the code is executing. When code is executed in a debugging mode, the developer can typically: view variable values during execution of the code, set breakpoints at which execution of the code will halt until the developer triggers continued execution, and/or step through execution of the code on a line-by-line basis.

Consider a case where a developer interacting with a client computer that is external to a cloud system desires to debug a program that is executing on a machine inside of the cloud system (also referred to herein as "web based debugging"): Traditional debuggers require that the debugger provide the machine's TCP/IP address/port in order for the client computer that is outside of the cloud's firewall to connect and communicate with the machine executing the program inside the cloud system. Therefore, the cloud administrator has to publish the machine's TCP/IP address/port and/or make modifications to the firewall. These approaches are not secure and do not scale for on demand use of debugging services.

SUMMARY

According to an embodiment, a debug session identifier representing a debug session for the web application is stored in local storage. The web application is located in multi-node cloud storage. The local storage resides on a developer computer system that executes outside of the multi-node cloud system. A stateless debugger node and a stateless target tester node are selected from at least one node pool in the multi-node cloud system. The stateless debugger node and the stateless target tester node are separate from each other. An internal connection is provided between the stateless debugger node and the stateless target tester node within the multi-node cloud system based on the debug session identifier during the debug session. The script that is injected into the web application is debugged while the web application executes on the stateless target tester node.

An embodiment provides for a tangible processor-readable storage device including instructions for a method of stateless debugging of a script injected into a web application that is located in a multi-node cloud system, the method comprising: storing, in local storage, a debug session identifier representing a debug session for debugging the web application located in the multi-node cloud system, wherein the local storage resides in on a developer computer system that executes outside of the multi-node cloud system; selecting a stateless debugger node and a stateless target tester node from at least one node pool in the multi-node cloud system, wherein the stateless debugger node and the stateless target tester node are separate from each other; providing an internal connection between the stateless debugger node and the stateless target tester node within the multi-node cloud system based on the debug session identifier during the debug session; and debugging the script injected into the web application while the web application executes on the stateless target tester node.

A further understanding of the nature and the advantages of particular embodiments disclosed herein may be realized by reference of the remaining portions of the specification and the attached drawings.

BRIEF DESCRIPTION OF THE DRAWINGS

FIG. 4 depicts a displayed debugger UI page, according to one embodiment.

FIG. 7 depicts a flowchart of a method of debugging a script injected into a web application that is located in a multi-node cloud system, according to one embodiment.

DETAILED DESCRIPTION OF EMBODIMENTS

Overview of Discussion

A web application cannot be downloaded from the cloud into a local environment, debugged in the local environment and then redeployed from the local environment back into the cloud. Therefore, various embodiments provide for debugging, from a computer system outside of the cloud, a web application while the web application is executing in the cloud.

Previous approaches to web based debugging have used a web browser, and HTTP cookies to ensure that a debugger request always connects with the same physical machine (also referred to as a "node") that is executing the web application being tested. However, this assumption is invalidated if the debugging application is executed on more than one node and a load balancer in the cloud system selects different nodes for each debugger request, even if the requests use the same HTTP cookie. This assumption is also invalidated if the browser uses a stateless messaging protocol such as REST that does not strictly support HTTP cookies.

Various embodiments relax the assumption that a debugger request is always serviced by the same machine executing a web application, thus, providing scalability and a better fit for stateless protocols, such as REST, that do not assume any node affinity between requests. Various embodiments eliminate dedicating nodes to debug programs or debugger requests and/or opening holes in firewalls for external access to those nodes.

As a part of debugging a web application while it is executing in a multi-node cloud system, various embodiments provide for: storing in local storage, a debug session identifier that is a universal unique identifier (UUID) representing a debug session; providing a stateless debugger node and a stateless target tester node that are separate from each other and that are selected from pool(s) of nodes in the multi-node cloud system; storing, in shared cloud storage, an association between the debug session identifier and information for locating the target tester node that executes the web application that is being debugged; and providing internal connections between the debugger node and the target tester node within the multi-node cloud system based on the debug session identifier.

An Illustration of a System

Figure 1A:
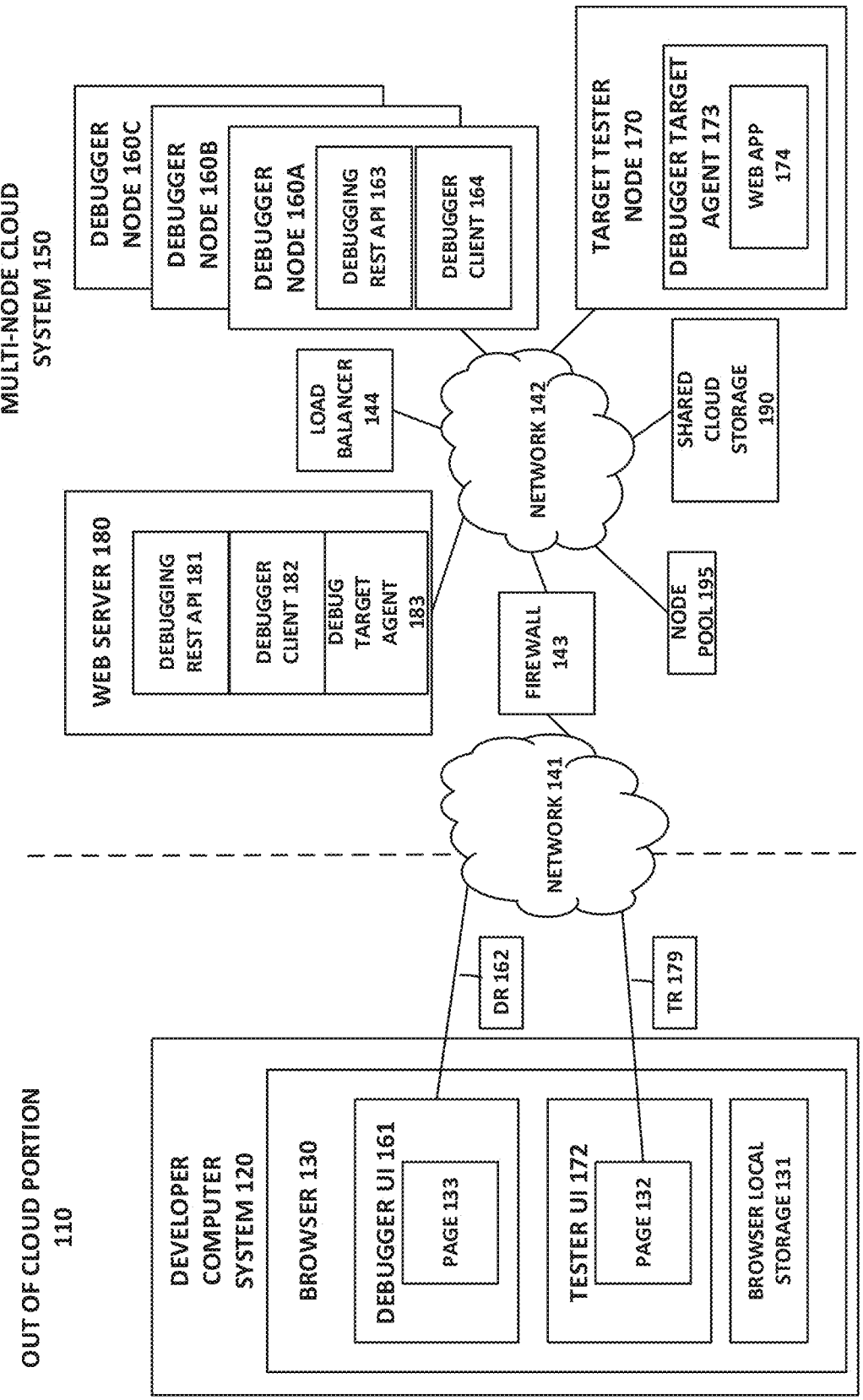
FIG. 1A depicts a block diagram of a system, according to one embodiment.
Figure 1B:
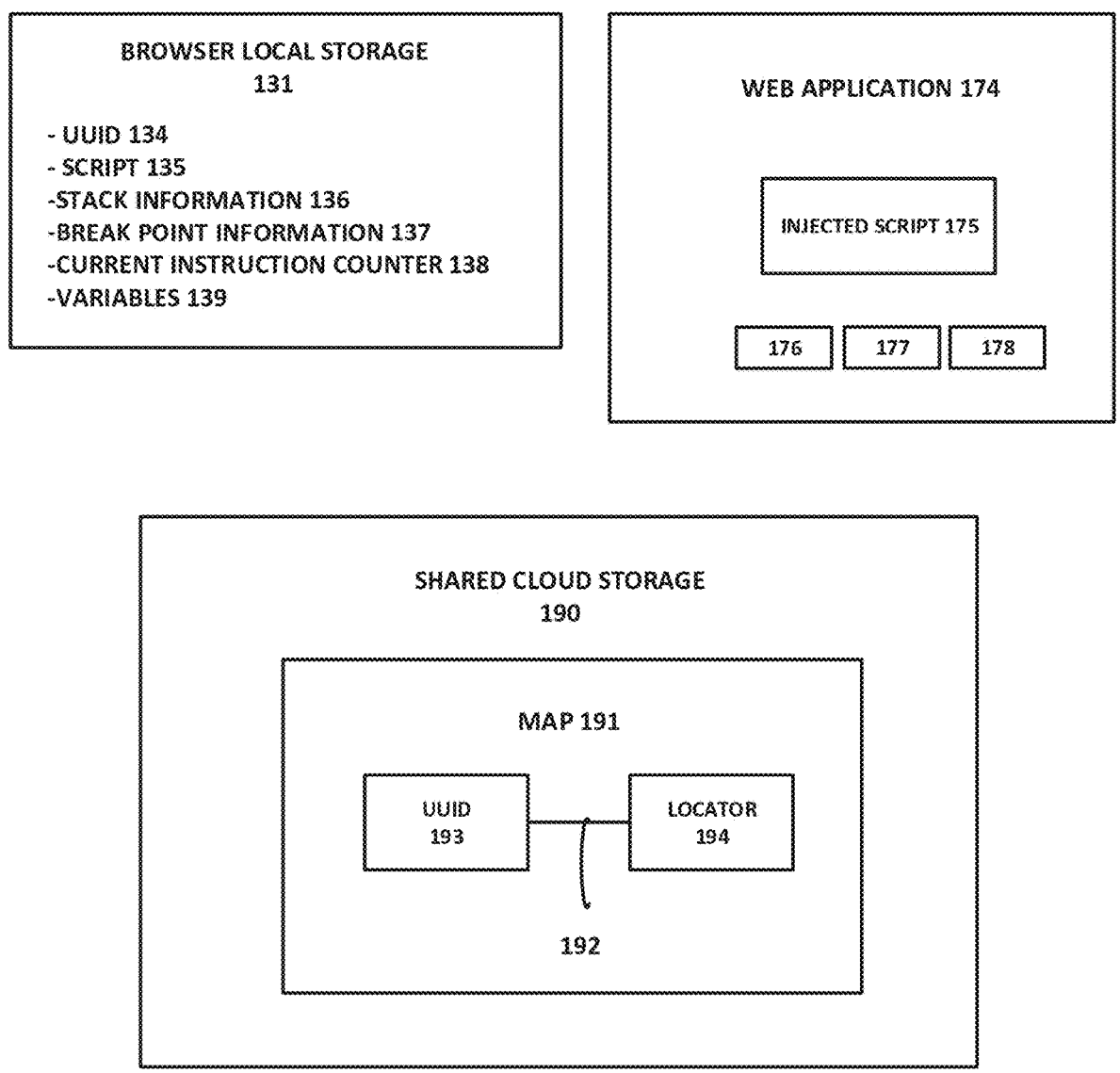
FIG. 1B depicts parts of the system, according to one embodiment.

FIGS. 1A and 1B depict a block diagram of a system 100, according to one embodiment.

The blocks that represent features in system 100 can be arranged differently than as illustrated, and can implement additional or fewer features than what are described herein. Further, the features represented by the blocks in FIGS. 1A and 1B can be combined in various ways. The system 100 can be implemented using software, hardware, hardware and software, hardware and firmware, or a combination thereof. Further, unless specified otherwise, various embodiments that are described as being a part of the system 100, whether depicted as a part of the system 100 or not, can be implemented using software, hardware, hardware and software, hardware and firmware, or a combination thereof.

The system 100 includes an out of cloud portion 110 that communicates with a multi-node cloud system 150 over the network 141. The out of cloud portion 110 includes a developer computer system 120. The developer computer system 120 includes a browser 130 which in turn includes browser local storage (BLS) 131, a debugger user interface (UI) 161, and a tester UI 172. The debugger UI 161 provides a displayed debugger UI page 133 and the tester UI 172 provides a displayed tester user interface 137 page(s) 132. The BLS 131 is inside of the browser 130 and includes a universal unique identifier (UUID) 134, a script 135, stack information 136, break point information and/or current instruction count 138. The UUID 134 is a unique session token used as a debug session identifier (ID). The page 133 communicates a debugger request 162 to the network 141 and the page 132 communicates a tester request 179 to the network 141. The debugger request 162 and the tester request 179 can include the UUID 134 from the browser local storage 131.

Although many embodiments are described in the context of browser local storage 131, embodiments are well suited to using local storage of the developer computer system 120 that is outside of the browser 130 instead of or in addition to BLS 131.

The cloud system 150 includes a firewall 143, a network 142, a load balancer 144, debugger nodes 160A, 160B, and 160C, a target tester node 170, a web server 180, a node pool 195, and shared cloud storage 190. The firewall 143, the load balancer 144, the debugger nodes 160A-160C, the target tester node 170, the web server 180, the node pool 195, and the shared cloud storage 190 communicate with each other over the network 142. Each debugger node 160A-160C includes a debugging Representation State Transfer (REST) Application Programming Interface (API) 163, and a debugger client 164. According to one embodiment, the debugger client 164 is an application. According to one embodiment, the debugger client 164 can be implemented with any type of computer executable instructions that are capable of servicing REST requests, as discussed herein. The debugger client 164 can be a web client (also referred to as a "debugger web client"). The debugging REST API 163 receives the debugger request 162 that are generated by the debugger UI 161.

The networks 141 and 142 maybe private networks or the Internet. Further, they may be partially private networks and partially public networks implemented with the Internet.

The target tester node 170 includes a debugger target agent 173 which in turn includes a web application 174 that is being tested on the target tester node 170. The web application 174 includes an injected script 175, and various modules 176, 177, and 178 that communicate with each other.

The debugging application is spread across more than one node (also referred to as "clustering"). For example, in one embodiment, the debugging application includes the debugging REST API 163, the debugger client 164, and the debugger target agent 173.

The tester UI 172, according to one embodiment, enables a developer to request execution of a remote web application 174. The page 133 is part of the debugger UI 161. The debugger UI 161 provides for connecting a debugger node with a target tester node and gathering state information about the execution of the web application on the target tester node, as discussed herein.

The debugger target agent 173 listens for requests from the debugger node 160A and communicates with the web application 174 to determine if the web application 174 should be suspended, for example, upon hitting a break point. Further, the debugger target agent 173 collects status information about the web application 174, such as the stack, frames of the stack, and variables of the web application 174, as discussed herein.

The web application 174 may be a "default" application that is in a state as it was purchased from a vendor (also commonly referred to as "out of the box"). The web application 174 can be implemented as an object of a class that provides various attributes and methods for operating on those attributes. Additional attributes and methods that are not provided by the class can be added to the object, as understood by one of ordinary skill in the art. Further, methods of the class can be overloaded, as understood by one of ordinary skill in the art. An example of attributes are various fields and user selectable options displayed pages of UIs, as discussed herein.

The web application 174 can be implemented as an object in an integrated development environment (IDE). The IDE may provide numerous objects for creating different types of web applications. In one example, the web application may be implemented as a business object, such as a sales force application. Embodiments are well suited for any type of web application that can be customized by injecting a script.

The script 175 is a copy of the script 135 and is injected into the application 174. The script can be used to customize the web application 174. The script is written in a scripting language, such as APACHE'S GROOVY™.

Execution of the injected script 175 is triggered, for example, when the object that represents the web application is edited during the lifecycle of the web application object. For example, assuming the web application object is for a sales force: execution of the injected script 175 can be triggered when the web application object is created due to a new sales opportunity becomes available, when the sale is followed up on, or when new information pertaining to the sale is obtained.

The web application 174 and scripts 135, 175 are examples of computer executable code. They may also be referred to as "programs." According to one embodiment, the web application and the script are implemented using debuggable objects.

The web server 180 includes a debugging REST API 181, a debugger client 182, and a debugger target agent 183. The code 163, 164, 173 are instances of respective code 181, 182, 183 from the web server 180 that are created, for example, when the load balancer 144 selects a node 160, 170 from the node pool 195 for the respective code to execute on. Although, for the sake of simplicity, FIG. 1A depicts the web server 180, embodiments, are well suited to a plurality of web servers.

The shared cloud storage 190 includes a map 191. The map 191 includes associations 192 between UUIDs 193 and locators 194 for target tester nodes 170. Examples of locators 194 are uniform resource locator (URL) addresses, Hypertext Transfer Protocol (HTTP) addresses, or other addressing schemes such as transmission control protocol/internet protocol (TCP/IP) and Java Message Service (JMS). Storing the locators 194 only within the cloud system 150 keeps sensitive information secure within the cloud system 150.

A tester request 179 is created in response to a user selecting a save button on the tester UI page 132. The tester request 179 is transmitted to the cloud system 150. The load balancer 144 selects a target tester node 170 from the node pool 195. The code 173, 174 is instantiated on the selected target tester node 170 from a web server 180.

The debugger request 162 is created in response to a user selecting a start debug button 410 on the debugger UI page 133. The debugger request 162 is transmitted to the cloud system 150. The load balancer 144 selects a debugger node 160 from the node pool 195. Code 163, 164 is instantiated on the selected debugger node 160 from the web server 180. Therefore, the web application can be completely separate from the debugger application and any node can be used as a debugger node 160 or a target tester node 170. The node pool(s) 195 can be located anywhere in in the world with communication access, as understood by one of ordinary skill in the art. Although FIG. 1A depicts only one node pool 195, embodiments are well suited to a plurality of node pools, as understood by one of ordinary skill in the art.

The debugger request 162 typically includes the UUID 134 that is a unique session token representing the debug session. The tester request 179 may also include the UUID 134. The tester request 179 requests execution of the web application. The debugger request 162 requests connections, disconnections, state of the target tester node including the web application, and/or requests change of that state, for example, by setting break points, stepping execution line-by-line, stopping at a break point, polling, suspending or resuming polling in execution, etc. as discussed herein.

Multiple debugger requests 162 can be used as part of testing the web application 174, as well as its injected script 175. For example, the user can interact with the debugger UI 161 to setup break points on various instructions in the web application 174, request to step to the next instruction of the web application 174, request to resume execution after a break point or a step. Further, the debugger UI 161 can obtain the state of the web application 174 and display that state. Each break point, each instruction step, each resume execution, and each obtained state of the web application 174 can result in a debugger request 162. A different debugger node 160A-160C can be selected to satisfy each of those debugger requests 162. According to one embodiment, a different debugger node 160A-160C can be used for each of the debugger requests 162. According to one embodiment, the load balancer 144 selects a debugger node 160A-160C from the node pool 195. The load balancer 144 can also select a target tester node 170 from the node pool 195. Selection of nodes from a pool of nodes, for example, by the load balancer 144, is well known in the art.

In order for a newly selected debugger node 160A-160C to connect with the target tester node 170 executing the web application 174 that is being tested, a UUID 134 from the browser local storage 131 can be passed in a debugger request 162. A debugger node 160A-160C can use the UUID from the debugger request 162 to find the UUID 193 in the map 191 that matches. The currently used debugger node 160A-160C can use the locator 194 associated with that UUID 134 to locate the target tester node 170 and connect with it, as discussed herein.

For the sake of simplicity, the system 100 depicts one developer computer system 120 and one target tester node 170. However, embodiments are well suited to multiple developer computer system, multiple target tester nodes, and multiple debugger nodes all executing simultaneously.

Embodiments are well suited for the debugger node and/or the target tester node to be executed with or without virtual machines. For example, they may each be executed on their own respective hardware computer systems or they may be executed in each of their own virtual machines that reside on one or more hardware computer systems.

The REST APIs 163 enable the use of a variety of client technologies in building debuggers. Embodiments provide for increased scalability by reducing the memory footprint. For example, the debugger nodes 160A-160C and the target tester nodes 170 do not manage state information between debugger requests 162. Any node can be used as a debugger node 160A-160C or a target tester node 170, thus, providing increased scalability and manageability. Since a different debugger node can be selected for each debugger request 162, there is no need to reserve debugger nodes.

The cloud load balancer 144 can select a node within the cloud system 150 to execute their web application 174. A UUID is generated for each target tester node. The UUID is valid only for a single execution of the debuggable web application 174. When the web application 174 starts execution, the target tester node 170 writes the UUID and the locator to the shared cloud storage that is within the firewall 143. The UUID is returned in response to the tester request to execute the web application 174. The web application's execution may wait for a debugger to set breakpoints before the web application's execution is allowed to proceed. The wait may time out after some period of inactivity. The wait time is configurable, according to one embodiment.

The UUID can be provided in debugger requests 162 in order to debug the web application 174 executing on the target tester node 170. The newly selected debugger node 160A-160C can use the UUID to obtain the locator of the target tester node 170, as discussed herein, to establish a connection with the target tester node within the firewall 143. Once the connection is established, the debug request 162 may use a standard debug protocol, such as Java Debug Wire Protocol (JDWP) for the Java Virtual Machine (JVM) to execute break points, advance the instruction counter, and/or acquire the state of the web application 174. After the completion of each debugger request 162, the debugger node 160A-160C is disconnected from the target tester node 170. Any state that has been used to service the debugger request 162 can be destroyed. On the next debugger request, a new debugger node 160A-160C can be selected, the locator 194 can obtained based on the UUID passed in the debugger request 162, and the locator 194 can be used to provide a connection between the new debugger node 160A-160C and the target tester node 170, as discussed herein.

According to one embodiment, JAVA™ Platform Debugger Architecture (JPDA) is used for connections and communications between the debugger nodes and their respective target tester nodes. However, unlike the JPDA standard, resuming the target tester node/thread on disconnect is not used or required. The browser 130 can send state information in the payload of the debugger requests 162, for example, to re-establish breakpoints, among other things.

Either the debugger UI or the tester UI can create or request creation of the UUID. The debugger node 160A-160C can create the UUID and store the UUID in the shared cloud storage, for example, in response to a request from the debugger UI. The target tester node 170 can create the UUID and store the UUID in the shared cloud storage, for example, when the web application 174 starts executing. A locator 194 of the target tester node 170 exists because the target tester node 170 was started. The agent 173 stores the association 192 in the shared cloud storage 190.

It may be desirable for one or more users to compile and/or execute their respective web applications without interfering with each other. Therefore, according to one embodiment, the web applications are isolated from each other. According to one embodiment, each web application 174 is isolated inside of a respective agent 173. For more information, refer to "Debugging Analysis in Running Multi-User systems," COMPLETE, which is incorporated in its entirety herein.

The out of cloud portion 110 and the multi-node cloud system 150 may be associated with the same company or organization or may be associated with different companies or organizations. For example, one company or organization may use their own multi-node cloud system to develop web applications and scripts to customize those web applications. However, a company or organization may use another company's or organization's multi-node cloud system to develop web applications and scripts customizing those web applications. In this case, they may use their own computer systems for the developer computer system that interacts with the multi-node cloud system. A company or organization may use another company's or organization's resources for both the developer computer systems and the multi-node cloud system.

Various embodiments can be implemented as a part of ORACLE®'s CLOUD™. However, embodiments are well suited for being implemented in any multi-node cloud based system. Further, embodiments are well suited for debugging web applications in any multi-node based cloud system using various types of communications methods and protocols.

User Interfaces

Figure 2:
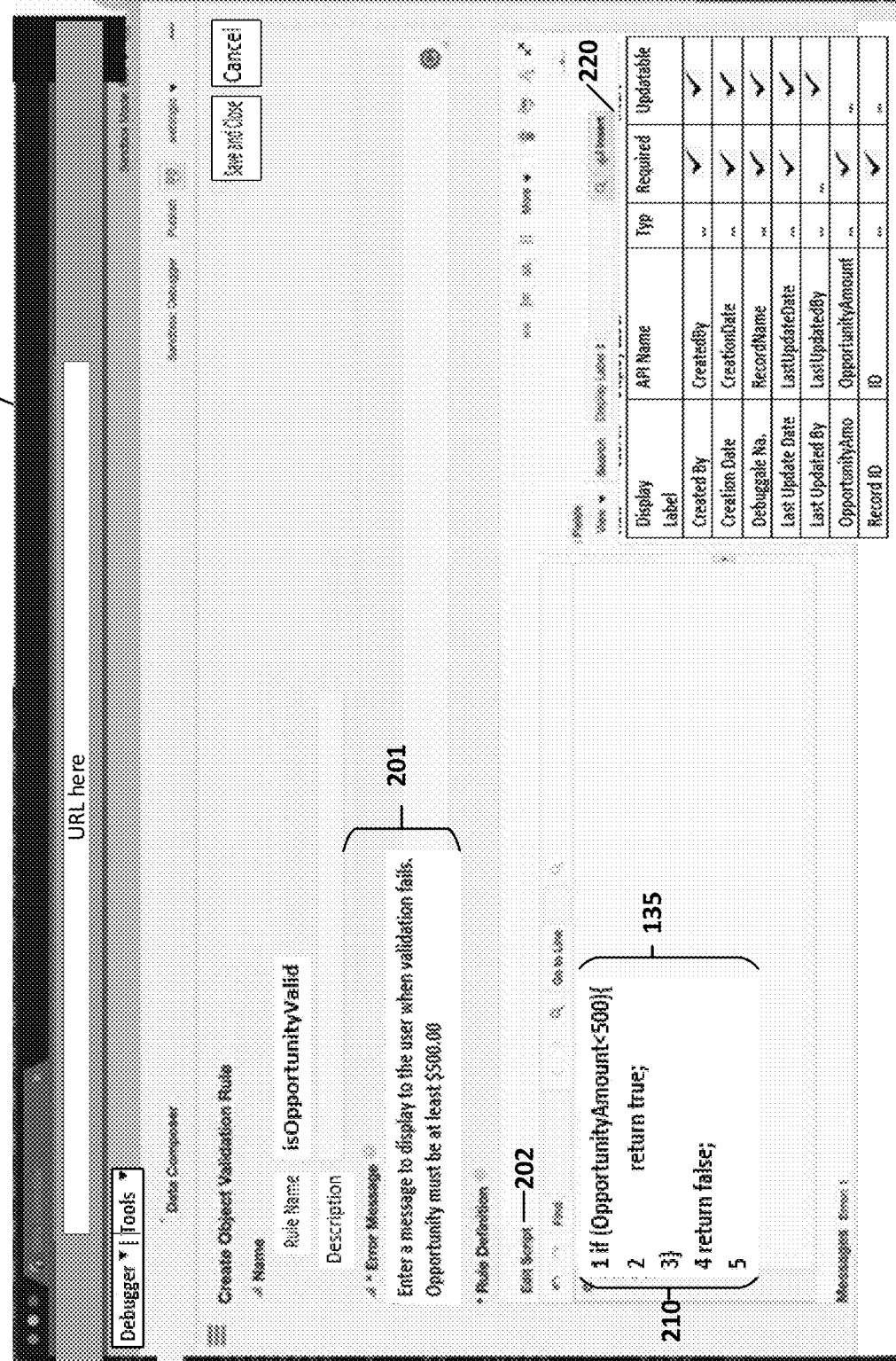
FIG. 2 depicts an example of a page for a script editor, according to one embodiment.

FIG. 2 depicts an example of a page 200 for a script editor, according to one embodiment. The page 200 includes a window 202 for entering the script 135. One example of a script is custom business logic and/or a "rule definition." As depicted, the script 135 that has been entered into the window 202 has instructions 210 of the script 135 that are numbered 1-5. The page 200 also depicts various types of information 220, such as its display label, its API name, whether it is required, and whether it is updateable. A copy of the script 135 is injected into the web application 174 resulting in injected script 175. The page 200 depicts an error message 201 that will be displayed if an error is detected in the script 175.

As depicted on page 200, the script pertains to a sales opportunity. The script's purpose, as indicated by the error message 201, is that a sales opportunity must be for at least $500.00. To demonstrate how debugging works, according to various embodiments, the script's logic depicted in the window 202 has an error. More specifically, sales amounts below $500 are treated as valid at instruction 2 and sales amounts above $500 are treated as invalid at instruction 4. The instructions 2 and 4 should be switched around in order to comply with the rule that opportunities are to be at least $500.00.

Figure 3:
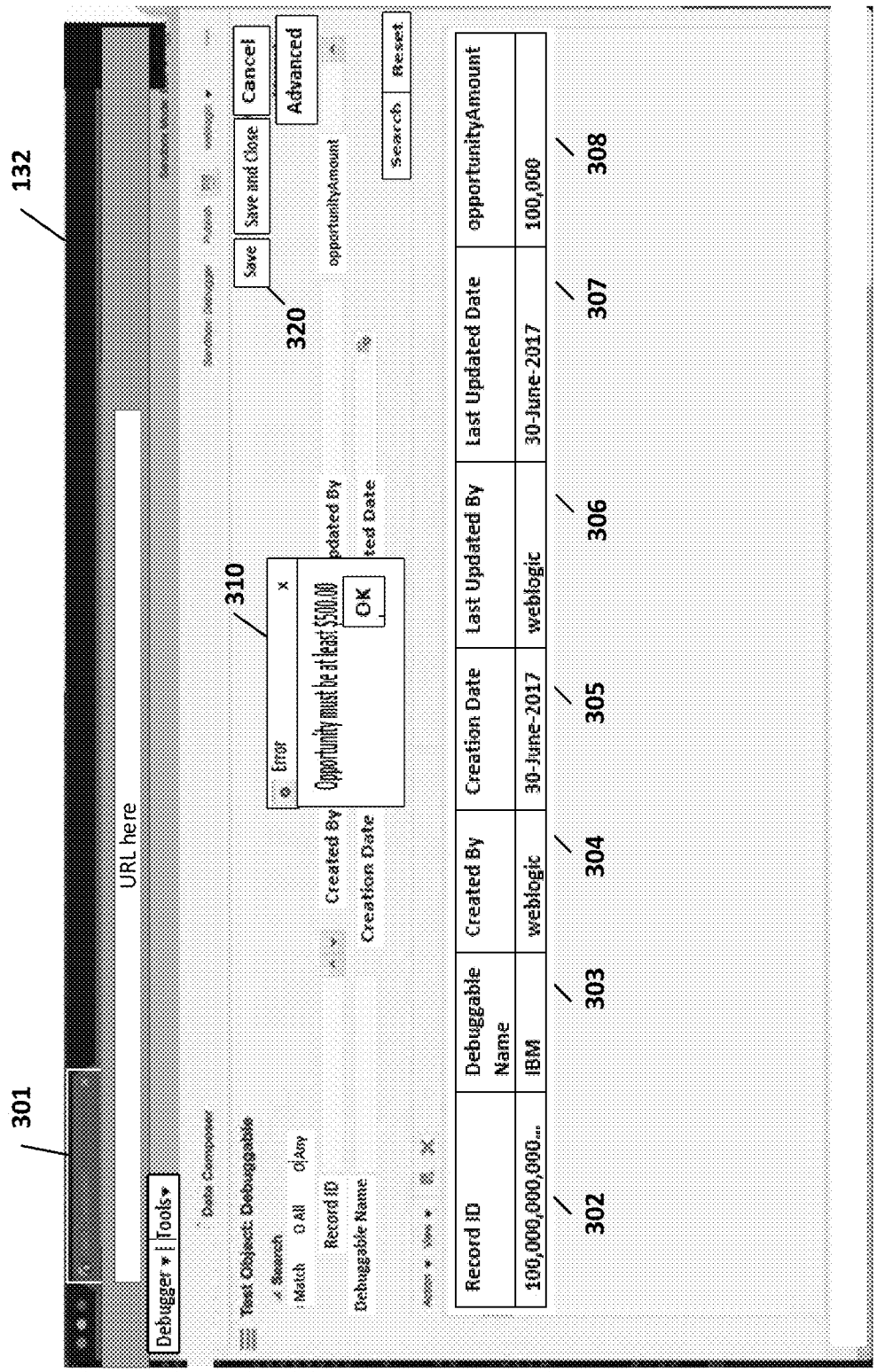
FIG. 3 depicts a displayed tester UI page, according to one embodiment.

FIG. 3 depicts a displayed tester UI page 132, according to one embodiment.

The page 132 includes a tab 301 for selecting that page 132. It also includes a field 302 for displaying a record identifier (ID) and data entry fields 303-308 for entering a name of the debuggable script, what entity created the script, the date the script was created, what entity last updated the script, and the amount of the opportunity. An example of a debuggable object is an object that represents a sales opportunity. The developer can inject scripts that the web application can execute when the object is modified. The tester UI enables the developer to modify and/or view attributes of the object.

Although various embodiments are described in the context of a sales opportunity, embodiments are well suited to any type of computer executable code that is injected into an application for the purposes of customizing that application. The page 132 also includes a save button 320 that saves information entered into fields 303-308. Selection of the save button 320 causes the web application 174 with the injected script 175 indicated by the page 132 to be executed. Since the script 135, 175 entered into the window 202 has an error, as discussed herein, an error message 310 is displayed. The error message 310 was defined at 201 on the page 200 (FIG. 2).

Since the script 135, 175 has an error, a developer interacting with the developer computer system 120 in the out of cloud portion 110 will debug the script 135, 175, for example, using a displayed debugger UI page 133 (FIG. 1A).

FIG. 4 depicts a displayed debugger UI page 133, according to one embodiment.

The displayed debugger UI page 133 includes a tab 301 that can be used to redisplay the tester UI page 132 and a tab 401 for causing the debugger UI page 133 to be displayed.

The page 133 includes a start debug button 410, and sections for displaying instructions 420 of the script 135, 175, the application 174's stack 440, variables 450, and a break point section 460 debugging the injected script can be started and stopped by toggling the start debug button 410. The break point section 460 includes rows 430 that each correspond with a break point that is set in the script 135, 175. As depicted in FIG. 4, a break point is set for each of the instruction lines 1, 2, and 4 of the script 135, 175. The stack section 440 depicts information about the modules 176, 177, 178 that communicate with each other during the execution of the script. For example, the stack could indicate that module 176 called module 177 which in turn called module 178. The variable section 450 depicts information about the variables that are being used when a particular instruction 420 of the script 135, 175 is being executed. For example, as depicted in FIG. 4, the debugger stopped when instruction 4 of the script 135, 175 had just executed. The variable section 450 depicts the values of the variables of the script 135 at that point in the execution of script 135, 175. The variable OpportunityAmount 451 has a value of 100000, and, therefore, the sales opportunity should be valid. However, since the script 135, 175 has an error, the value of false is being returned at instruction 4 of the script 135, 175.

Illustration of Interactions

Figure 5A:
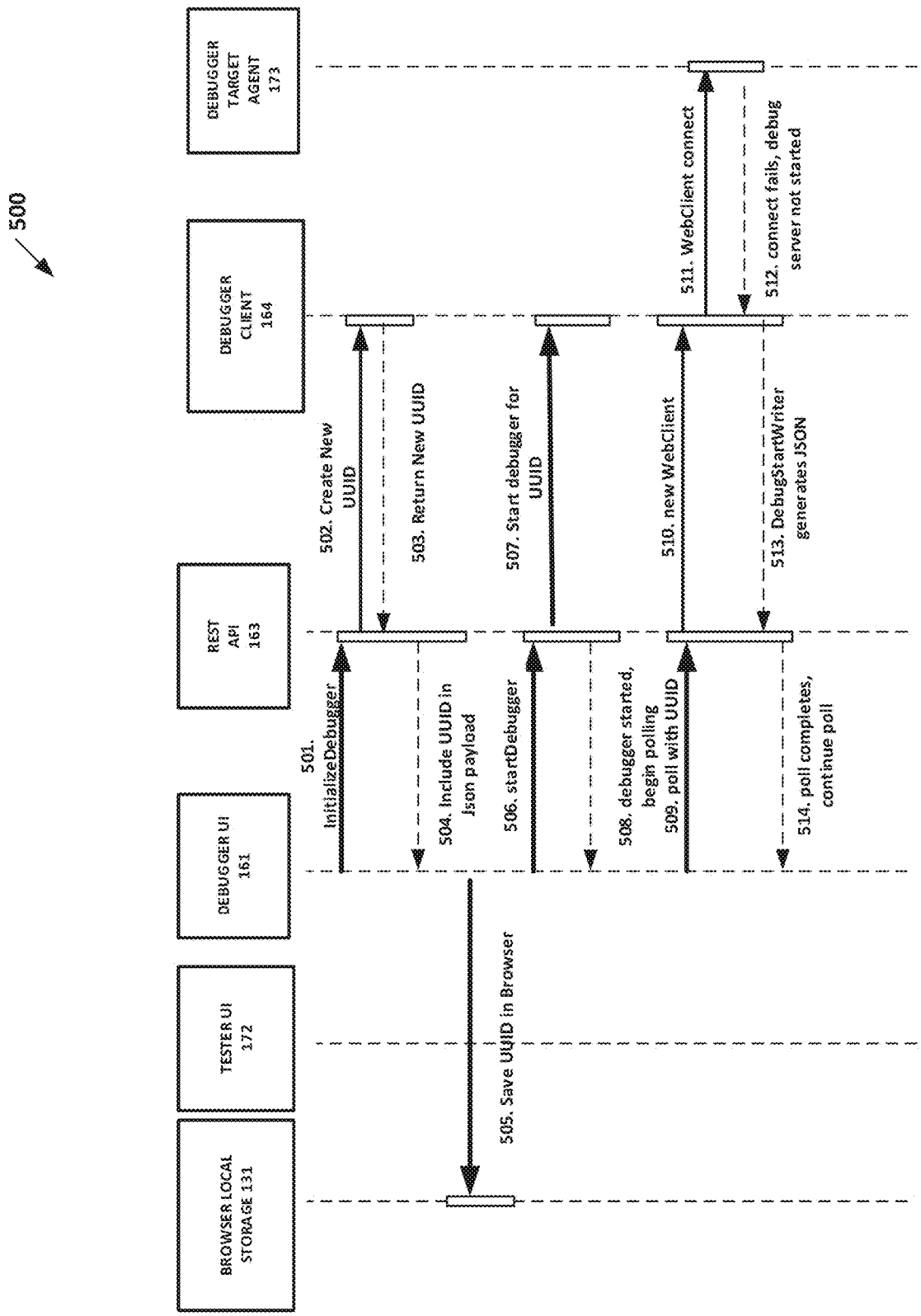
FIGS. 5A-5D depict a collaboration interaction diagram of interactions between various entities of system during a debug session for a web application, according to one embodiment.
Figure 5B:
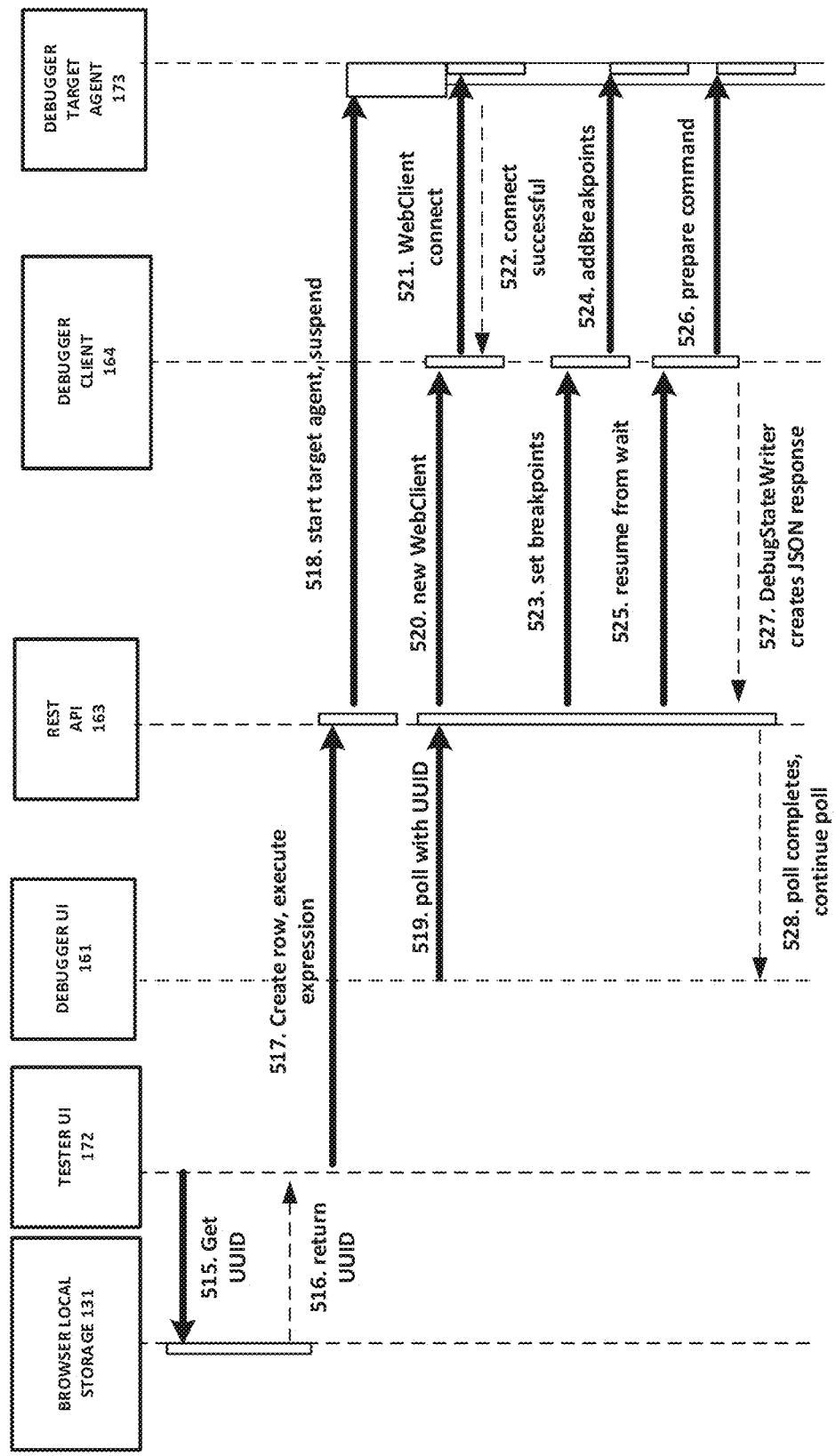

FIGS. 5A-5B depict a collaboration interaction diagram 500 of interactions between various entities of system 100 during a debug session for a web application, according to one embodiment. The entities, as depicted in FIGS. 5A-5B, include the browser local storage 131, the tester UI 172, the debugger UI 161, the REST API 163, the debugger client 164, and the debugger target agent 173. Local storage of the developer computer system 120 that is outside of the browser could be used instead of the BLS 131.

Although specific operations are disclosed in diagram 500, such operations are exemplary. That is, embodiments of the present invention are well suited to performing various other operations or variations of the operations recited in diagram 500. It is appreciated that the operations in diagram 500 may be performed in an order different than presented, and that not all of the operations in diagram 500 may be performed The description of FIGS. 5A-5D shall refer primarily to FIGS. 1A and 1B.

In this illustration, assume that the user selected the start debug button 410 (FIG. 4) starting the debug session. The debug session, as illustrated in FIGS. 5A-5D, includes operations 501-565. Embodiments are well suited for different operations and a different number of operations, as understood by one of ordinary skill in the art.

In response to user selection of the start debug button 410 (FIG. 4), the debugger UI 161 transmits an initializeDebugger message to REST API 163 at operation 501. In this illustration, assume that the load balancer 144 selects debugger node 160A from the node pool 195.

At operation 502, the REST API 163 requests that the debugger client 164 create a new UUID to represent the debugging session. The debugger client 164 creates the new UUID in response to operation 501 to initialize debugger request from the debugger UI 161. At operation 503, the debugger client 164 returns a new UUID that it created to the REST API 163. At operation 504, the REST API 163 provides the UUID to the debugger UI 161, for example, in a JSON payload. At operation 505, the debugger UI 161 causes the UUID to be stored in the browser local storage 131 as UUID 134 (FIG. 1A).

At operation 506, the debugger UI 161 sends a start debugger message to the REST API 163. At operation 507, the start debugger message with the UUID is transmitted from the REST API to the debugger client 164. At operation 508, the REST API 163 sends a message to the debugger UI 161 that the debugger has been started and that polling should begin. In response, the debugger UI 161 will poll the debugger target agent 173 on regular intervals. For example, as depicted in FIGS. 5A-5D, polling is performed at operations 509-514, 519-528, and 529-549.

As part of polling at operations 509-514, the debugger client 164 attempts to connect with the target tester node 170. Since the target tester node 170 has not been selected and instantiated with the tester server application 171 and the application 174, the web connection attempt at operation 511 fails. Operation 512 provides the failed connection status to the debugger client 164. Operation 513 provides the failed connection status from the debugger client 164 to the REST API 163, which in turn is provided to the debugger UI 161 via operation 514. The failed connection status can be displayed on the debugger UI 161.

Assume that a user of the developer computer system 120 selects the save button 320 (FIG. 3). Operations 515-575 are performed in response. At operations 515-516, the tester UI 172 obtains the UUID 134 from the browser local storage 131. At operation 517, the tester UI 172 transmits a tester request 179 that includes the UUID 134. In operation 518, the REST API 163 transmits a message to start the target tester node 170 and to suspend debugging. The load balancer 144 selects a target tester node 170 from the node pool 195. The target tester node 170 is started, the debugger target agent 173 is instantiated on the target tester node 170 from debug test agent 183 on the web server 180, and the application 174 is also instantiated from a web server 180 that is in the cloud system 150. A locator 194 of the target tester node 170 exists because the target tester node 170 was started in response to operation 518. The agent 173 stores the association 192 in the shared cloud storage 190 in response to operation 518. Any number of hardware computer systems or virtual machines in the cloud system 150 can be selected as the target tester node 170. Since no break points have been set yet, operation 518 informs the debugger target agent 173 to suspend debugging.

Polling is performed at a regular intervals again at operations 519-528. The load balancer 144 in the cloud system 150 may select different computer system from the node pool 195 for the debugger node. For example, debugger node 160B may be selected. Therefore, the UUID 134 is associated with the polling operation 519. Since the target tester node 170 is up and running, the debugger client connect at operation 521 is successful. Operation 522 between the agent 173 and the debugger client 164 indicates that the connection was successful.

Operation 523 from REST API 163 to the debugger client 164 sets the break points and operation 524 from the debugger client 164 to the debugger target agent 173 adds the break points. In this illustration, break points were set for instructions 1, 2, and 4 as depicted in the break point section 460 of page 133 on FIG. 4.

Operations 525 and 526 instruct the debugger target agent 173 to resume execution of the web application 174 after being suspended in response to operation 518.

Operation 527 from the debugger client 164 to the REST API 163 provides state associated with the debugger at this point in time. The state information can be displayed in the debugger UI 161.

At operations 529-532, polling is performed in a similar manner to operations 519-522 at a regular interval using the UUID 134. The load balancer 144 can select a new debugger node from the node pool 195 for operations 529-532. Assume that the debugger node 160C is selected. Debugger node 160C can use the UUID passed with operation 529 to locate the target tester node 170 via the association 192, as discussed herein. At operation 533, the REST API 163 requests the state of the debugging.

In this illustration, assume that a break point was encountered. Therefore operation 535 indicates de-queuing a break-point event.

With respect to operations 536-539: According to one embodiment, the communication between the debugger nodes and the target tester node is based on JAVA™ Platform Debugger Architecture (JDPA). Agents 173 provide for isolating execution of web applications 174 from each other when they are executing on the same Java Machine. The agent 173 transmits and receives standard JDPA events. For example, according to one embodiment, the debugger target agent 173 sends a break point notification event when the break point is first hit. It does not know that it needs to send the break point notification event again after a debugger client reconnect as depicted at operation 531. Therefore, operations 536-539 are used to resynchronize the break points after the reconnection of the debugger client 164 in the new debugger node with the debugger target agent 173 in response to operation 531. According to another embodiment, the debugger client 164 informs the debugger target agent 173 that a break point was hit when it reconnects with the debugger target agent 173.

The state of various information, such as the stack, frames of the stack, and variables are obtained from the target tester node 170 via the debugger target agent 173, for example, at operations 540-547. At operation 548, the REST API 163 instructs the debugger client 164 to disconnect.

At operation 549, the state of the stack, frames of the stack, and variables is provided to the REST API 163 and can be displayed on a page of the debugger UI 161. Further, polling is stopped because no state changes will occur in the web application since a break point was hit as indicated in operation 535.

Operations 528-549 pertain to a break point that was hit in the script 175. When a break point is hit, the debugger UI 161 can suspend polling at regular intervals because there will be no state changes from the debugger target agent 173 to be displayed in the debugger UI.

Operations 550-561 are performed in response to a user indicating on the debugger UI 161 that they want to step to the next instruction in the script 175. For example, referring to FIG. 4, assume that execution is on instruction 2 of the script 135 and the user wants to step to instruction 3 but there is no break point in instruction 3. The user can select a step instruction operation from the debugger UI 161. Operation 550 includes the UUID since the load balancer 144 can select a new debugger node that will connects with the target tester node 170. Assume in this illustration that debugger node 160A is selected for operations 550-561. The UUID associated with operation 550 is used to obtain the locator 194 of the target tester node 170 from the map 191 via the association 192. Operations 551-553 are performed in a similar manner to operations 530-532 that are used to re-establish a connection between the debugger target agent 173 and a debugger client 164 on the newly selected debugger node 160A that was selected to handle operations 550-561. Operation 553 indicates that the connection is successful because, as discussed herein, the target tester node 170 is executing.

Operations 554, 557-560 pertain to resynchronizing the break points after the reconnection of the debugger client 164 in the new debugger node with the debugger target agent 173 in response to operation 552. This is done in a similar manner to operations 536-539, as discussed herein.

Operation 555 and 556 communicate the step command associated with operation 550 from the REST API 163 to the debugger client 164 and on to the debugger target agent 173.

At operation 561, the REST API 163 writes the response from the debugger target agent 173. For example, various state information, such as stack, variables, current instruction counter, and break point information are provided to the debugger UI 161. The provided state information can be displayed on a page 133, as discussed herein. Further, operation 561 also informs the debugger UI 161 to resume polling after it was suspended in response to operation 549.

Operations 562-565 provide clean up, for example, in response to either the execution of the web application 174 completing or the user exiting the debugging session via a user interface 161 or 172. For example, operation 562 stops the debugger. Operation 563 provides for deleting the association 192 from the map 191. Operation 564 provides for deleting UUID 134 and other information that is stored in the browser local storage 131 that is used for the debug session depicted in FIGS. 5A-5D. Operation 565 indicates that the tester request 179 that was started by operation 517 has completed. The debug session ends at operation 565.

State information, such as stack, frame, and variables, are stored in the agent 173 during the execution of a web application 174 for a particular tester request 179.

Since the user interfaces 161 and 172 reside on the browser 130, these user interfaces 161 and 172 can access the information 134-138 in the browser's local storage 131. For example, a UUID 134 can be obtained and associated with various operations 509, 519, 529, 550; a script entered into the editor can be stored at 135; stack and associated frame information from the target tester node 170 can be stored at 136 and displayed in the stack section 440; break point information and/or current instruction counter can be stored at 137 and/or 138 and displayed on the page 133. More specifically, the information 137, 138 can be used to determine which of the instructions 420 to highlight indicating that execution is at that instruction; variables associated with the application 171 can be stored at 139 and displayed in the variable section 450. More specifically, if execution of the application 174 is on line 4 of the script 135, the value 100000 can be obtained from the target tester node 170, for example, via operations 546-547 and 549, and displayed in the variable section 450.

According to one embodiment, any black line that originates from the debugger UI 161 or the target UI 172 is a web request and can be handled by any node in the cloud 150. For any tester request 179, there can be multiple debugger requests 162. Operations 517-565 represent a tester request 179. Multiple debugger requests 162 are represented at 519-528, 529-549, 550-561, and 562-564. The black lines for operations 501, 506, 509, 519, 529, 550, 562 from the debugger UI 161 represent debugger requests 162 and the black lines for operation 517 from the tester UI 172 represents tester requests 179.

According to various embodiments, a different debugger node 160A-160C can be used for processing each of the debugger requests 162. For example, operations 501, 505, 506, 509, 519, 529, 550, and 562 each represent a debugger request 162. Each of the sets of operations 501-504, 505, 506-508, 509-514, 519-528, 529-549, 550-561, and 562-564 are performed as a part of a respective debugger request 162. In an example, debugger node 160A can perform processing with respect to operations 501-504; debugger node 160B can perform processing with respect to operation 505; debugger node 160C can perform processing with respect to operations 506-508; and so on.

Since a different debugger node 160A-160C can process each of the debugger requests 162, the UUID is being passed with various operations, such as operations 509, 519, 529, and 550. The debugger client 164 uses the UUID to access the locator 194 of the target tester node 170 based on the association 192 in the shared cloud storage 190's map 191. The debugger client 164 then locates the target tester node 170 based on the locator 194 and connects with the target tester node 170, for example, as depicted at least in operations 521, 531, and 552.

Figure 6A:
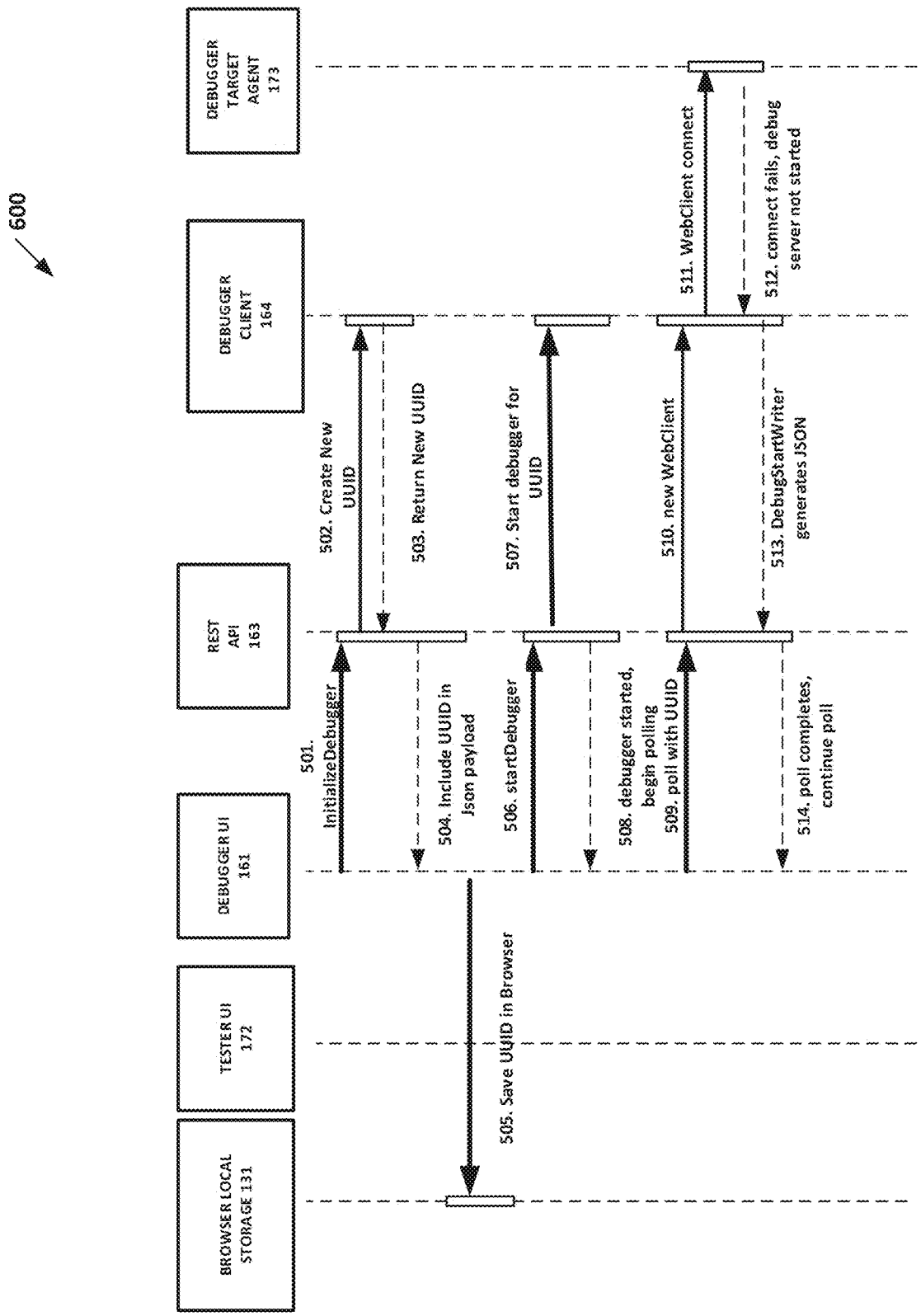
FIGS. 6A-6D depict a collaboration interaction diagram of interactions between various entities of system during a debug session for a web application, according to another embodiment.
Figure 6B:
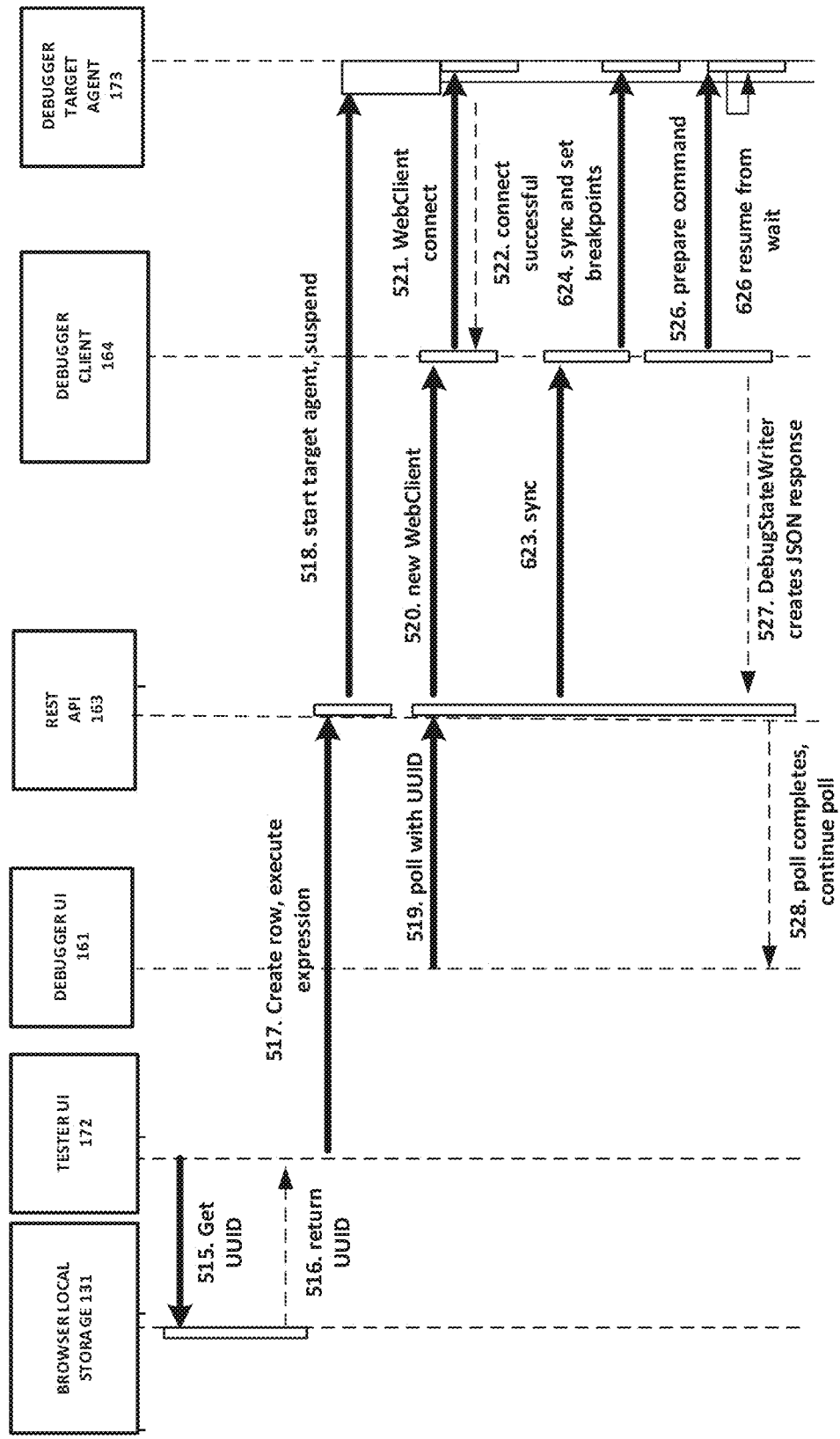

FIGS. 6A-6B depict a collaboration interaction diagram 600 of interactions between various entities of system 100 during a debug session for a web application, according to one embodiment. The entities, as depicted in FIGS. 6A-6B, include the browser local storage 131, the tester UI 172, the debugger UI 161, the REST API 163, the debugger client 164, and the debugger target agent 173. Local storage of the developer computer system 120 that is outside of the browser could be used instead of the BLS 131.

Although specific operations are disclosed in diagram 600, such operations are exemplary. That is, embodiments of the present invention are well suited to performing various other operations or variations of the operations recited in diagram 600. It is appreciated that the operations in diagram 600 may be performed in an order different than presented, and that not all of the operations in diagram 600 may be performed The description of FIGS. 6A-6D shall refer primarily to FIGS. 1A, 1B, and 5A-5D.

The collaboration interaction diagram 600 depicted in FIGS. 6A-6D uses many of the operations that are used in collaboration interaction diagram 500 depicted in FIGS. 5A-5D. For example, both diagrams 500 and 600 refer to operations 501-522, 526-532, 535, 540-549, 551-553, 555, 556, and 561-565. However, whereas collaboration 500 uses syncHandle technology with respect to operations 523, 524, 533, 534, 536, 537, 539, 550, 554, 557, 558, 559, and 560, collaboration 600 uses JPDA technology with respect to operations 623, 624, 626, 633, 34, 636, 637, 650, 656, and 657. With the JDP technology, when a debugger client 164 reconnects, for example at operations 521, 531, 532 of FIGS. 6A-6D, it can synchronize with the debugger target agent 173 to ensure that the client state reflects the target state, as if it had not disconnected at all. According to one embodiment, using JPDA includes updating the debugger client 164 with the current location of the debugger target agent 173 if the debugger target agent 173 is suspended.

With respect to the sync call operation 633 from REST API 163 to Debug Client 164: 1) Debug Client calls isInterrupted on Target Agent, 2) If interrupted, the Debug Client sends a break point request for the current interrupted location, and 3) Target Agent sends a break point event corresponding to the break point request.

Use Cases

Although various embodiments are described herein in the context of a single target request, various embodiments are well suited to multiple, concurrent target requests. The following discusses three use cases involving multiple, concurrent target requests.

In a first use case, multiple, concurrent target requests for different debug session identifiers (ids) are routed to the same node.

For example, two or more different browsers (clients) with different debug session ids have test requests running on the same target tester node (also referred to as a "target node"). For the sake of illustration, assume that there are two different browsers (clients). The target requests are stateless as well and can be routed/serviced by the same target tester node. In this case the map 191 (also referred to herein as a "debug table") in cloud storage may have multiple entries for a target tester node:

Debug session id 1→Target node A
Debug session id 2→Target node A

None, one, or many of sessions may be suspended when the debugger polls. To handle this case, the connect request from the debugger to the target node also includes the debug session id for the debugger request. The connect listener on the target node can then "route" the connect request to the debug target agent (also referred to as a "debug agent") for test request for that debug session id. The test request already knows what debug session id started it, per the existing specification.

In a second use case, multiple, concurrent target requests for the same debug session id are routed to different target nodes.

For example, it is possible that a single browser (client) to send multiple, concurrent test requests. These may be routed to different target nodes. In this case the debug table cloud storage may have multiple entries for a debug session id:

Debug session id 1→Target node A
Debug session id 1→Target node B

None, one, or many of the threads may be suspended when the debugger polls. In this case, the debugger request could do the following:

a. Display debug state for the both the requests on target node A and for target node B. Each test request can be displayed using a separate thread. The UI can allow the debug user to select which thread they wish to "debug." In other words, which thread to display debug information and which thread to send requests).

b. In order to hide the threading from the debug user, according to various embodiments the rows in the debug table can be ordered. The debugger only connects to the "first" node and accordingly only displays the debug state of that node. Subsequent debug requests can continue to connect to that same target node such that the user is only debugging one request at a time. When that target request completes, the target node is removed from the debug table and subsequent debugger requests can connect to the next target node in the ordered storage.

In the third use case, multiple, concurrent target requests for the same debug session id are routed to the same node.

For example, it is possible that the multiple target requests from the same client to be routed to the same target node. This is a combination of the first use case and the second use case. In this third use case, the debug table may contain:

Debug session id 1→Target node A
Debug session id 1→Target node A

None, one or many of the test requests for the debug session id could be running and/or suspended on the target node.

As in the first use case, the connection router on the target node can select a target request. However, since both requests have the same debug session id the router will select the "first" target debug agent it finds. The router list can also be ordered so that subsequent debug requests are always routed the same request, while that request is still running. Once that target completes, debugger requests can be routed to the next target request in the router table on the target node.

Illustration of a Method

FIG. 7 depicts a flowchart 700 of a method of debugging a script injected into a web application that is located in a multi-node cloud system, according to one embodiment.

Although specific operations are disclosed in flowchart 700, such operations are exemplary. That is, embodiments of the present invention are well suited to performing various other operations or variations of the operations recited in flowchart 700. It is appreciated that the operations in flowchart 700 may be performed in an order different than presented, and that not all of the operations in flowchart 700 may be performed.

The discussion of flowchart 700 shall refer mostly to FIGS. 1A, 1B and 5A-5D.

At 710, the method begins

At 720, store, in local storage, a debug session identifier representing a debug session for debugging the web application located in the multi-node cloud system. The local storage resides on a developer computer system 120 executing outside of the multi-node cloud system.

For example, the debug session can begin when a user selects a user option, such as a start debug button 410 (FIG. 4), of the debugger UI 161. The UUID 134, that represents that debug session, is stored in the browser local storage 131 of browser 130 that resides on the developer computer system 120. Alternatively, the UUID 134 can be stored on local storage of the system 120 outside of the browser 130. The UUID represents a debug session, as depicted in FIGS. 5A-5D, for debugging the web application 174 with its injected script 175. The web application 174 is located in the multi-node cloud system 150. The cloud system 150 is multi-node because it includes multiple nodes 160 and 170. Further, cloud system 150 is multi-node because it includes a node pool for selecting nodes 160A-160C and 170. The browser local storage 131 is located in the browser 130 outside of the multi-node cloud system 150.

Although the debugger target agent 173 can obtain state information, such as stack, frame, or variable information, from the web application 174 and provide that state information to an entity, such as the debugger UI 161, the agent 173 and the target tester node 170 do not maintain any state. Therefore, the agent 173 and the target tester node 170 are "stateless."

At 730, select a stateless debugger node and a stateless target tester node from at least one node pool in the multi-node cloud system. For example, the load balancer 144 selects nodes from a node pool 195 and uses the selected nodes as debugger nodes 160A-160C and as the target tester node 170. The selected nodes 160A-160C do not include state information. Therefore, they are stateless. Information that is used to maintain state are stored outside of the nodes 160A-160C and 170. For example, the UUID 134 is stored in the browser local storage 131 and the association 192 is stored in the shared cloud storage 190. This enables the use of REST APIs 163 and increased scalability by selecting nodes to serve as debugger nodes or target tester nodes, as discussed herein. According to one embodiment, the nodes in the node pool 195 are homogenous and any node can be selected for use as a debugger node or a target tester node.

The stateless debugger node 160A-160C and the stateless target tester node 170 are separate from each other.

At 740, provide an internal connection between the stateless debugger node and the stateless target tester node within the multi-node cloud system based on the debug session identifier during the debug session.

For example, operations 511, 521, 531, and 552 (FIGS. 5A-5D) each request connections between a stateless target tester node and a stateless debugger node, as discussed herein. Operation 511 fails, as discussed herein, because a target tester node has not yet been selected, initialized, and started. The debug session identifier is used for finding the target tester node using the association in the shared cloud storage, as discussed herein. The debug session identifier is used during the debug session that includes operations 501-565 depicted in FIGS. 5A-5D. Each debug session is represented with its own universally unique identifier. The debug session ends either when the web application 174 completes execution or when the one or more of the UIs 161, 172 exit. The connections are internal to the multi-node cloud system 150 at least because no information pertaining to the connections are provided outside of the cloud system. More specifically, the locator 194 that is used for connections is stored inside of the cloud system 150. Further, none of the entities that reside in the out of the cloud portion 110 have information pertaining to the connections.

At 750, debug the script injected into the web application while the web application executes on the stateless target tester node. For example, a copy of the script 135 is injected into the web application 174 as injected script 175. The web application 174 executes on the stateless target tester node 170.

The execution of the debugging is controlled from the developer computer system 120 via the UIs 161, 172.

At 760, the method ends.

An embodiment provides for wherein the script customizes the web application and wherein the method further comprises: receiving the script; and injecting the script into the web application. For example, a copy of the script 135 is received and injected into the web application 174 as injected script 175. Injected script 175 is a copy of script 135.

An embodiment provides for storing, in shared cloud storage that resides in the multi-node cloud system, an association between the debug session identifier and information for locating the target tester node, wherein the debug session identifier is a universal unique identifier (UUID) representing the debug session. For example, the association 192 between the UUID 193 and the locator 194 is stored in a map 191 in shared cloud storage 190. The UUID 193 is a debug session identifier that represents the debug session. An example of a debug session is operations 501-565 depicted in FIGS. 5A-5D.

An embodiment provides for receiving the debug session identifier in a request; accessing the shared cloud storage; finding a locator of the stateless target tester node based on the debug session identifier; and locating the stateless target tester node based on the locator. The debugging requests 162 and the tester requests 179 are requests. The requests can be REST requests or web requests or a combination thereof. The debug requests 162 and the tester requests 179 can include the UUID 134 that serves as a debug session identifier. The UUID 134 can be used for finding the locator 194 in the shared cloud storage 190 based on the association 192, as discussed herein. The locator 194 is used for locating the stateless target tester node 170, as discussed herein.

An embodiment provides for receiving a tester request in response to a user interaction with the developer computer system that executes outside of the multi-node cloud system; in response to the tester request, selecting the stateless target tester node from the at least one node pool; and instantiating the web application and the script on the stateless target tester node. For example, a tester request 179 can be created in response to a user interacting with the tester UI 172 executing on the developer computer system 120. The developer computer system 120 executes outside of the multi-node cloud system 150. The load balancer 144 can select the stateless target tester node 170 from at least one node pool 195 associated with the cloud system 150. The web application 174 and the script 175 are instantiated on the stateless target tester node 170.

An embodiment provides for wherein the user interaction is selection of a user option displayed on a tester user interface (UI) executing in a browser executing on the developer computer system. An example of the browser is browser 130. An example of a user option is the save button 320 (FIG. 3).

An embodiment provides for selecting a different stateless debugger node for each of a plurality of debugger requests that are received from the developer computer system that executes outside of the multi-node cloud system, wherein the plurality of debugger requests are associated with the debug session. For example, the load balancer 144 selects a different debugger node 160A-160C for each of the debugger requests 162 received from the developer computer system 120.

An embodiment provides for creating connections between each of the stateless debugger nodes to the stateless target tester node based on the debug session identifier, wherein there is one connection between each of the stateless debugger nodes and the stateless target tester node. For example, operations 511, 521, 531, and 552 (FIGS. 5A-5D) each request connections between a stateless target tester node 170 and a stateless debugger node 160A-160C.

An embodiment provides for performing debugging operations with respect to the web application in response to each of the debugging requests. Examples of debugging operations include setting break points; stepping instructions line-by-line; requesting state information about the target tester node 170, the web application 174, or the injected script 175. Examples of state information include at least stack information, frame information, variable information, as discussed herein.

An embodiment provides for disconnecting a particular connection after the debugging operation associated with a particular debugging request has been performed.

An embodiment provides for polling the stateless target tester node at regular intervals; and obtaining state information with respect to the script from the stateless target tester node based on the polling. For example, the stateless target tester node 170 is periodically polled at operations 509, 519, and 529, as discussed herein.

An embodiment provides for wherein the stateless debugger node is a first stateless debugger node the method further comprises: receiving a first debugger request from a debugger user interface that executes in the browser outside of the multi-node cloud system; selecting the first stateless debugger node in response to the first debugger request; connecting the first stateless debugger node with the stateless target tester node based on the debug session identifier, wherein a connection between the first stateless debugger node and the stateless target tester node is created internally to the multi-node cloud system; debugging a first portion of the script; returning the first stateless debugger node to the at least one pool; receiving a second debugger request from the debugger user interface; selecting a second stateless debugger node in response to the second debugger request; connecting the second stateless debugger node with the stateless target tester node based on the debug session identifier, wherein a connection between the second stateless debugger node and the stateless target tester node is created internally to the multi-node cloud system; debugging a second portion of the script; disconnecting the second stateless debugger node from the stateless target tester node; and returning the second stateless debugger node to the at least one pool.

A Computer Readable Medium and an Apparatus

Unless otherwise specified, any one or more of the embodiments described herein can be implemented using processor readable instructions which reside, for example, in tangible processor-readable storage device of a computer system or like device. The tangible processor-readable storage device can be any kind of physical memory that instructions can be stored on. Examples of the tangible processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within tangible processor-readable storage device of a computer system and are executed by one or more processors of the computer system. When executed, the instructions cause a computer system to implement the functionality of various embodiments of the present invention. For example, the instructions can be executed by a processor. The processor is a hardware processor, such as a central processing unit, associated with the computer system. The tangible processor-readable storage device is hardware memory and the one or more processors are hardware processors.

An embodiment provides for a tangible processor-readable storage device including instructions for a method of stateless debugging of a script injected into a web application that is located in a multi-node cloud system, the method comprising: storing, in local storage, a debug session identifier representing a debug session for debugging the web application located in the multi-node cloud system, wherein the local storage resides on a developer computer system that executes outside of the multi-node cloud system; selecting a stateless debugger node and a stateless target tester node from at least one node pool in the multi-node cloud system, wherein the stateless debugger node and the stateless target tester node are separate from each other; providing an internal connection between the stateless debugger node and the stateless target tester node within the multi-node cloud system based on the debug session identifier during the debug session; and debugging the script injected into the web application while the web application executes on the stateless target tester node.

An embodiment provides an apparatus for stateless debugging of a script injected into a web application that is located in a multi-node cloud system, comprising: one or more processors; and a tangible processor-readable storage device including instructions for: storing, in local storage, a debug session identifier representing a debug session for debugging the web application located in the multi-node cloud system, wherein the local storage resides on a developer computer system executing outside of the multi-node cloud system; selecting a stateless debugger node and a stateless target tester node from at least one node pool in the multi-node cloud system, wherein the stateless debugger node and the stateless target tester node are separate from each other; providing an internal connection between the stateless debugger node and the stateless target tester node within the multi-node cloud system based on the debug session identifier during the debug session; and debugging the script injected into the web application while the web application executes on the stateless target tester node, wherein the debugging is controlled from the developer computer system.

Example Computer Environment

Figure 8:
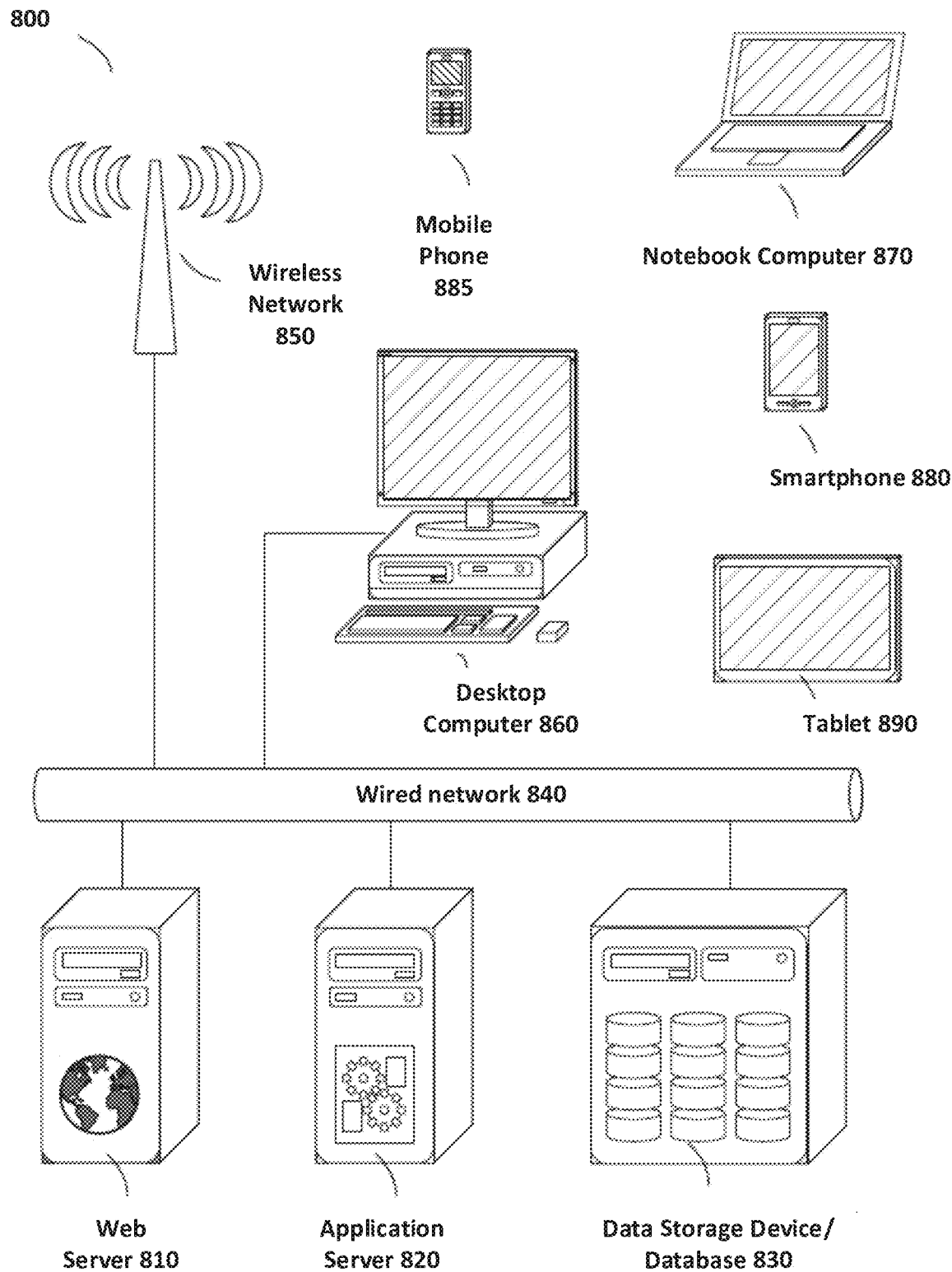
FIG. 8 is a general block diagram of a system and accompanying computing environment usable to implement the embodiments of FIGS. 1A-7.

FIG. 8 is a general block diagram of a system 800 and accompanying computing environment usable to implement the embodiments of FIGS. 1A-7. The example system 800 is capable of supporting or running various hardware and/or software modules and associated methods discussed with reference to FIGS. 1A-7. Note that certain embodiments may be implemented using one or more standalone applications (for example, residing in a user device) and/or one or more web-based applications implemented using a combination of client-side and server-side code.

The general system 800 includes user devices 860-890, including desktop computers 860, notebook computers 870, smartphones 880, mobile phones 885, and tablets 890. The general system 800 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 800 is shown with five user devices, any number of user devices can be supported.

A web server 810 is used to process requests from web browsers and standalone applications for web pages, electronic documents, enterprise data or other content, and other data from the user computers. The web server 810 may also provide push data or syndicated content, such as RSS feeds, of data related to enterprise operations.

An application server 820 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 820 are adapted to process input data and user computer requests and can store or retrieve data from data storage device or database 830. Database 830 stores data created and used by the data applications. In an embodiment, the database 830 includes a relational database that is adapted to store, update, and retrieve data in response to SQL format commands or other database query languages. Other embodiments may use unstructured data storage architectures and NoSQL (Not Only SQL) databases.

In an embodiment, the application server 820 includes one or more general-purpose computers capable of executing programs or scripts. In an embodiment, web server 810 is implemented as an application running on the one or more general-purpose computers. The web server 810 and application server 820 may be combined and executed on the same computers.

An electronic communication network 840-850 enables communication between user computers 860-890, web server 810, application server 820, and database 830. In an embodiment, networks 840-850 may further include any form of electrical or optical communication devices, including wired network 840 and wireless network 850. Networks 840-850 may also incorporate one or more local-area networks, such as an Ethernet network, wide-area networks, such as the Internet; cellular carrier data networks; and virtual networks, such as a virtual private network.

The system 800 is one example for executing applications according to an embodiment of the invention. In another embodiment, web server 810, application server 820, and optionally database 830 can be combined into a single server computer application and system. In a further embodiment, virtualization and virtual machine applications may be used to implement one or more of the web server 810, application server 820, and database 830.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1A-7, a developer computer system 120 can be implemented on a client computing device, such as a desktop computer 860, notebook computer 870, smartphone 880, mobile phone 885, tablet 890, of FIG. 8 and/or other computing devices. In a particular example embodiment, the user computing devices 860-890 run browsers, e.g., used to display the user interfaces. User interface 161, 172 may be viewed from a client computing device, such as a desktop computer 860, notebook computer 870, smartphone 880, mobile phone 885, tablet 890, of FIG. 8 and/or other computing devices.

In a particular example embodiment, browsers of the desktop computer 860, notebook computer 870, smartphone 880, mobile phone 885, tablet 890 of FIG. 8 connect to the Internet, represented by the wired network 840 and/or wireless network 850 as shown in FIG. 8, to access one or more network-coupled servers, databases, and/or associated cloud-based functionality, as represented by the modules of FIG. 1A. For example, one or more of the web server 810 and/or application server 820 shown in FIG. 8 may be used to host software corresponding to 163, 164, 173, 174, 181-183, 135 of FIGS. 1A and 1B, as detailed more fully below. One or more databases 830 as shown in FIG. 8 may be used to host shared cloud storage 190. The networks 141, 142 can be implemented as networks 840.

Figure 9:
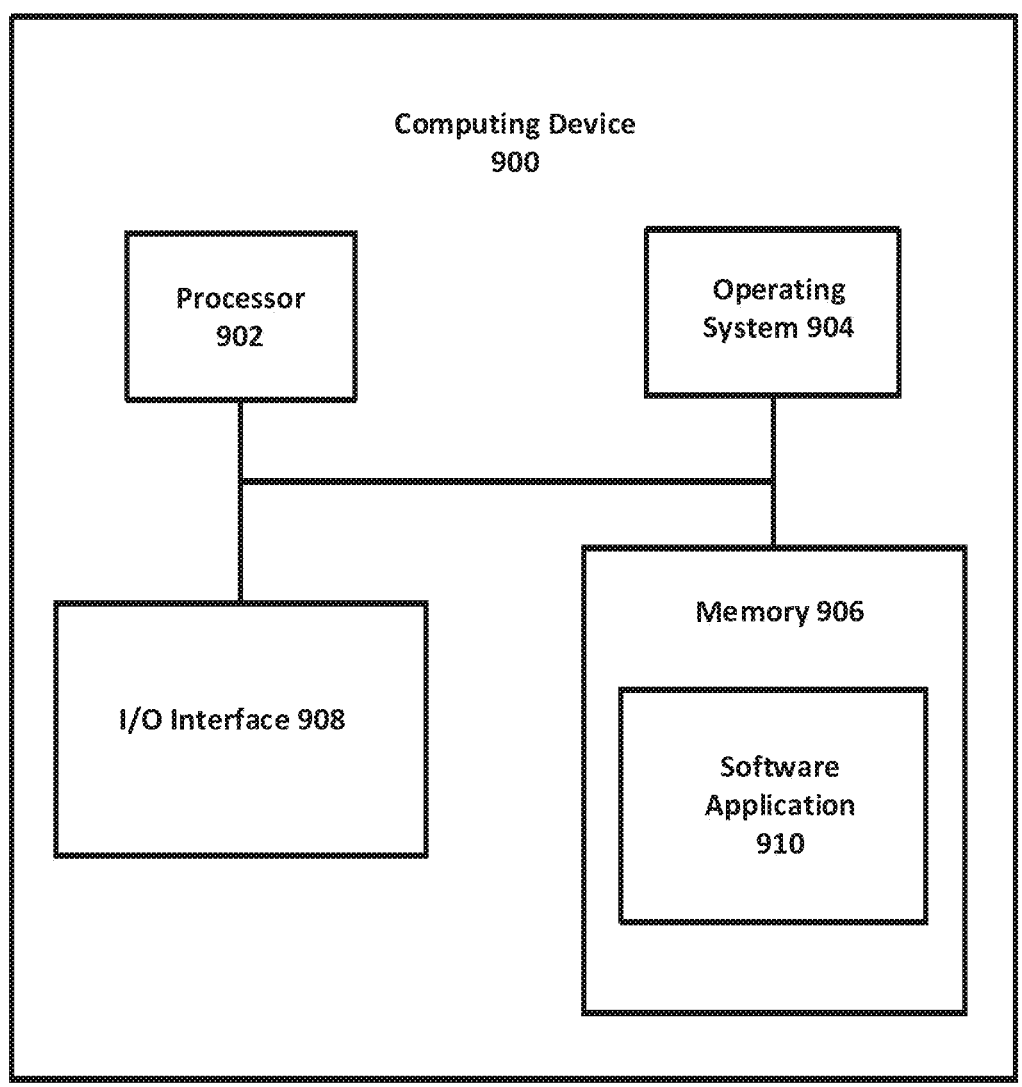
FIG. 9 is a general block diagram of a computing device usable to implement the embodiments described herein.

FIG. 9 is a general block diagram of a computing device 900 usable to implement the embodiments described herein. While the computing device 900 of FIG. 9 may be described as performing one or more of the steps in the embodiments herein, in other embodiments any suitable component or combination of components of the computing device 900 or any suitable processor or processors associated with system 900 may facilitate performing the steps.

FIG. 9 illustrates a block diagram of an example computing system 900, which may be used for implementations described herein. For example, computing system 900 may be used to implement user devices 860-890, and server devices 810, 820 of FIG. 8 as well as to perform the method implementations described herein. In some implementations, computing system 900 may include a processor 902, an operating system 904, a memory 806, and an input/output (I/O) interface 908. In various implementations, processor 902 may be used to implement various functions and features described herein, as well as to perform the method implementations described herein. While processor 902 is described as performing implementations described herein, any suitable component or combination of components of system 900 or any suitable processor or processors associated with system 900 or any suitable system may perform the steps described. Implementations described herein may be carried out on a user device, on a server, or a combination of both.

Computing device 900 also includes a software application 910, which may be stored on memory 806 or on any other suitable storage location or computer-readable medium. Software application 910 provides instructions that enable processor 902 to perform the functions described herein and other functions. The components of computing system 900 may be implemented by one or more processors or any combination of hardware devices, as well as any combination of hardware, software, firmware, etc.

For ease of illustration, FIG. 9 shows one block for each of processor 902, operating system 904, memory 806, I/O interface 908, and software application 910. These blocks 902, 904, 806, 908, and 910 may represent multiple processors, operating systems, memories, I/O interfaces, and software applications. In various implementations, computing system 900 may not have all of the components shown and/or may have other elements including other types of components instead of, or in addition to, those shown herein.

The computer systems 120, nodes 160, 170, load balancer 144, firewall 143, and web servers 180 (FIG. 1A) may be hardware computing systems, such as 900 or they may be virtual machines executed on one or more hardware computing systems, such as 900.

CONCLUSION

Although the description has been described with respect to particular embodiments thereof, these particular embodiments are merely illustrative, and not restrictive. For example, the features and operations could be arranged differently.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable storage device including instructions for a method of stateless injected script debugging, the method comprising:
    receiving, at a multi-node cloud system, a plurality of debugger requests each including a debug session identifier, wherein the debugger requests are for debugging a script injected into a web application during a debug session, wherein each of the debugger requests include the same debug session identifier, and wherein a different one of the debugger requests is associated with each of a plurality of break points set for debugging the script;

for each of the debugger requests, connecting a new stateless debugger node with a single stateless target tester node, wherein stateless debugger nodes and stateless target tester nodes reside inside of the multi-node cloud system;

debugging the script injected into the web application on the stateless target tester node while controlling the debugging from a developer computer system that is outside of the multi-node cloud system; and after completion of each of the debugger requests: disconnecting a current stateless debugger node from the stateless target tester node, and destroying any state stored in the multi-node cloud system used for servicing a current debugger request, wherein the current stateless debugger node was used for a previous debugger request.

2. The non-transitory processor-readable storage device as recited by claim 1, wherein the method further comprises:

for each of the debugger requests after a first debugger request: requesting the new stateless debugger node, finding a locator of the stateless target tester node based on the debug session identifier; connecting the new stateless debugger node with the stateless target tester node based on the locator; and resuming debugging of the script while the web application executes on the stateless target tester node.

3. The non-transitory processor-readable storage device as recited by claim 2, wherein the locator is stored inside of the multi-node cloud system.

4. The non-transitory processor-readable storage device as recited by claim 1, wherein the stateless target tester node is used to service all debugger requests associated with the debug session.

5. The non-transitory processor-readable storage device as recited by claim 1, wherein connections between the stateless target tester node and the stateless debugger nodes are internal to the multi-node cloud system.

6. The non-transitory processor-readable storage device as recited by claim 1, wherein the web application is in a state as purchased from a vendor.

7. The non-transitory processor-readable storage device as recited by claim 1, wherein stateless debugger nodes and stateless target tester node can be executed with or without virtual machines.

8. The non-transitory processor-readable storage device as recited by claim 1, wherein the method further comprises:

for a first debugger request: selecting a first stateless debugger node and a stateless target tester node from at least one node pool in a multi-node cloud system, providing connection between the current stateless debugger node and the stateless target tester node within the multi-node cloud system based on a debug session identifier during a debug session, and debugging the script injected into the web application while the web application executes on the stateless target tester node, wherein the first stateless debugger node becomes the current stateless debugger node for the subsequent debugger request.

9. The non-transitory processor-readable storage device as recited by claim 8, wherein the method further comprises:

for each subsequent debugger requests after the first debugger request: connecting the new stateless debugger node with the stateless target tester node based on the debug session identifier.

10. The non-transitory processor-readable storage device as recited by claim 1, wherein debug session identifiers are unique for each debugger session.

11. A method for stateless injected script debugging, the method comprising:

receiving, at a multi-node cloud system, a plurality of debugger requests each including a debug session identifier, wherein the debugger requests are for debugging a script injected into a web application during a debug session, wherein each of the debugger requests include the same debug session identifier, and wherein a different one of the debugger requests is associated with each of a plurality of break points set for debugging the script;

for each of the debugger requests, connecting a new stateless debugger node with a single stateless target tester node, wherein stateless debugger nodes and stateless target tester nodes reside inside of the multi-node cloud system;

debugging the script injected into the web application on the stateless target tester node while controlling the debugging from a developer computer system that is outside of the multi-node cloud system; and after completion of each of the debugger requests: disconnecting a current stateless debugger node from the stateless target tester node, and destroying any state stored in the multi-node cloud system used for servicing a current debugger request, wherein the current stateless debugger node was used for a previous debugger request.

12. The method as recited by claim 11, wherein the method further comprises:

for each of the debugger requests after a first debugger request: requesting the new stateless debugger node, finding a locator of the stateless target tester node based on the debug session identifier; connecting the new stateless debugger node with the stateless target tester node based on the locator; and resuming debugging of the script while the web application executes on the stateless target tester node.

13. The method as recited by claim 12, wherein the locator is stored inside of the multi-node cloud system.

14. The method as recited by claim 11, wherein the stateless target tester node is used to service all debugger requests associated with the debug session.

15. The method as recited by claim 11, wherein connections between the stateless target tester node and the stateless debugger nodes are internal to the multi-node cloud system.

16. The method as recited by claim 11, wherein the web application is in a state as purchased from a vendor.

17. The method as recited by claim 11, wherein stateless debugger nodes and stateless target tester node can be executed with or without virtual machines.

18. The method as recited by claim 11, wherein the method further comprises:

for a first debugger request: selecting a first stateless debugger node and a stateless target tester node from at least one node pool in a multi-node cloud system, providing connection between the current stateless debugger node and the stateless target tester node within the multi-node cloud system based on a debug session identifier during a debug session, and debugging the script injected into the web application while the web application executes on the stateless target tester node, wherein the first stateless debugger node becomes the current stateless debugger node for the subsequent debugger request.

19. The method as recited by claim 18, wherein the method further comprises:
for each subsequent debugger requests after the first debugger request: connecting the new stateless debugger node with the stateless target tester node based on the debug session identifier.

20. An apparatus for stateless injected script debugging, comprising:
one or more processors; and
a tangible processor-readable storage device including instructions for:
receiving, at a multi-node cloud system, a plurality of debugger requests each including a debug session identifier, wherein the debugger requests are for debugging a script injected into a web application during a debug session, wherein each of the debugger requests include the same debug session identifier, and wherein a different one of the debugger requests is associated with each of a plurality of break points set for debugging the script;
for each of the debugger requests, connecting a new stateless debugger node with a single stateless target tester node, wherein stateless debugger nodes and stateless target tester nodes reside inside of the multi-node cloud system;
debugging the script injected into the web application on the stateless target tester node while controlling the debugging from a developer computer system that is outside of the multi-node cloud system; and
after completion of each of the debugger requests: disconnecting a current stateless debugger node from the stateless target tester node, and destroying any state stored in the multi-node cloud system used for servicing a current debugger request, wherein the current stateless debugger node was used for a previous debugger request.

* * * * *

UNITED STATES PATENT AND TRADEMARK OFFICE
CERTIFICATE OF CORRECTION

PATENT NO. : 10,866,884 B2
APPLICATION NO. : 16/713691
DATED : December 15, 2020
INVENTOR(S) : Smiljanic et al.

It is certified that error appears in the above-identified patent and that said Letters Patent is hereby corrected as shown below:

In the Drawings

Figure 5C:
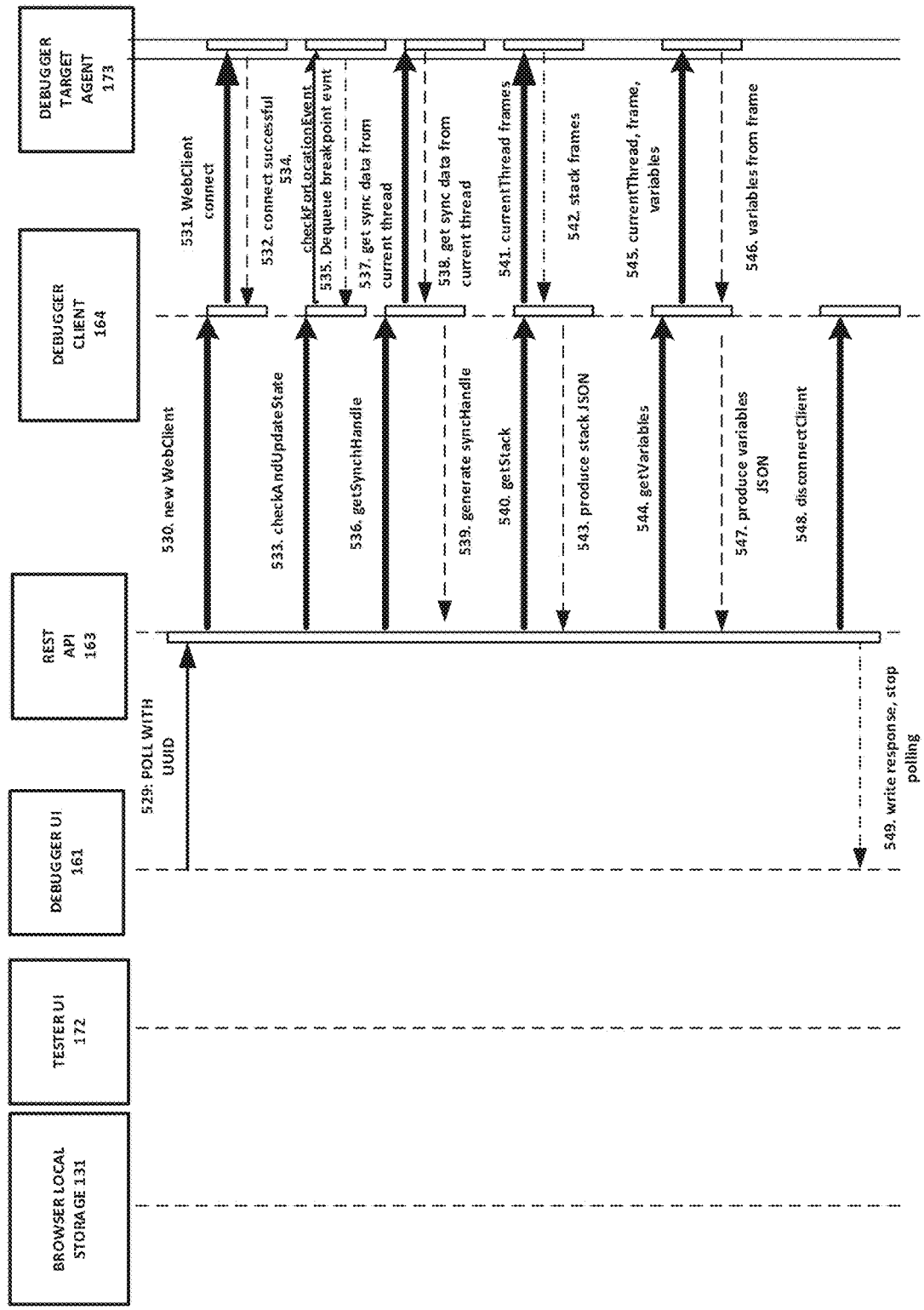
Figure 5D:
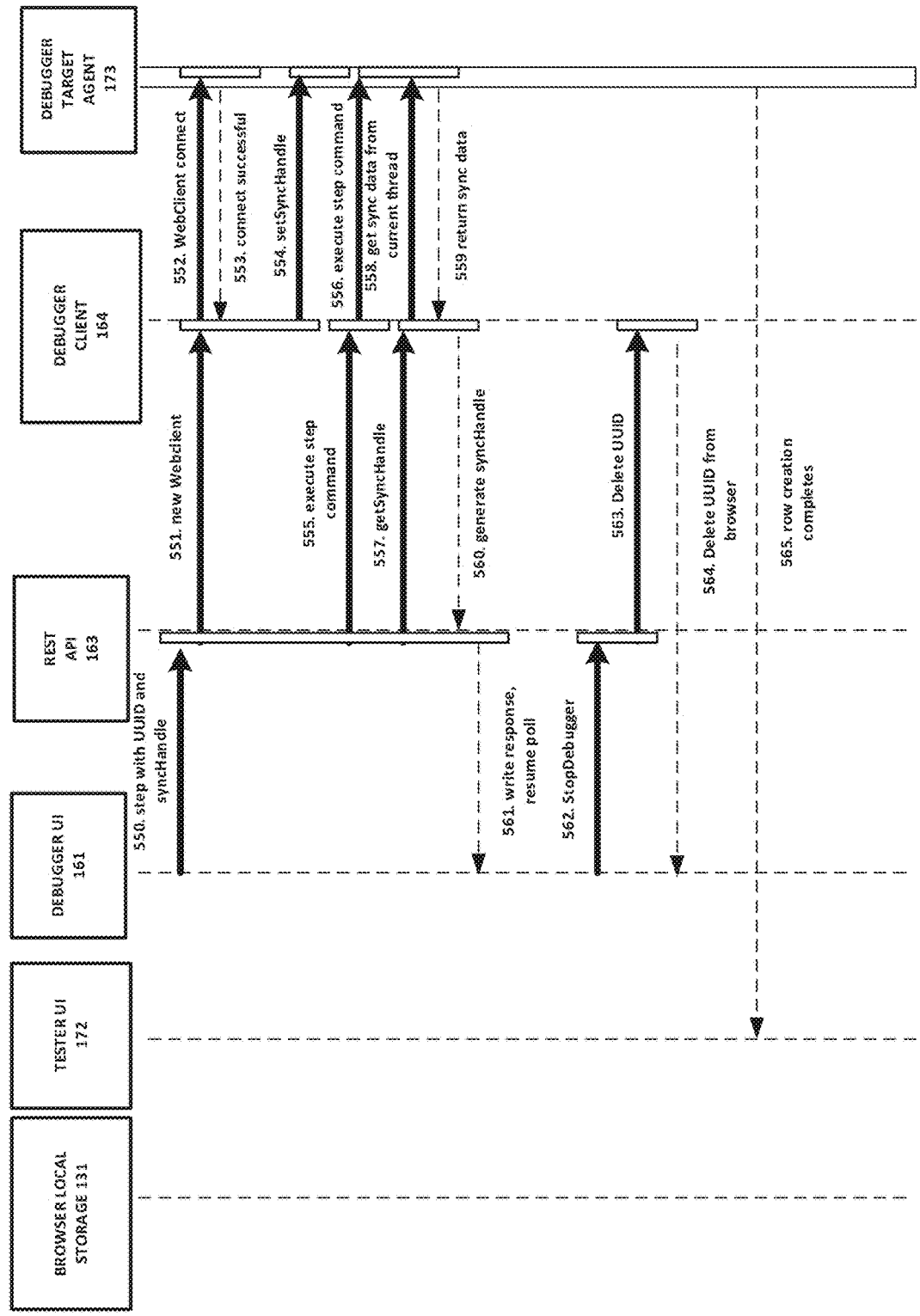

On sheet 8 of 16, in FIGURE 5C, under Reference Numeral 536, Line 1, delete "getSynchHandle" and insert -- getSyncHandle --, therefor.

Figure 6C:
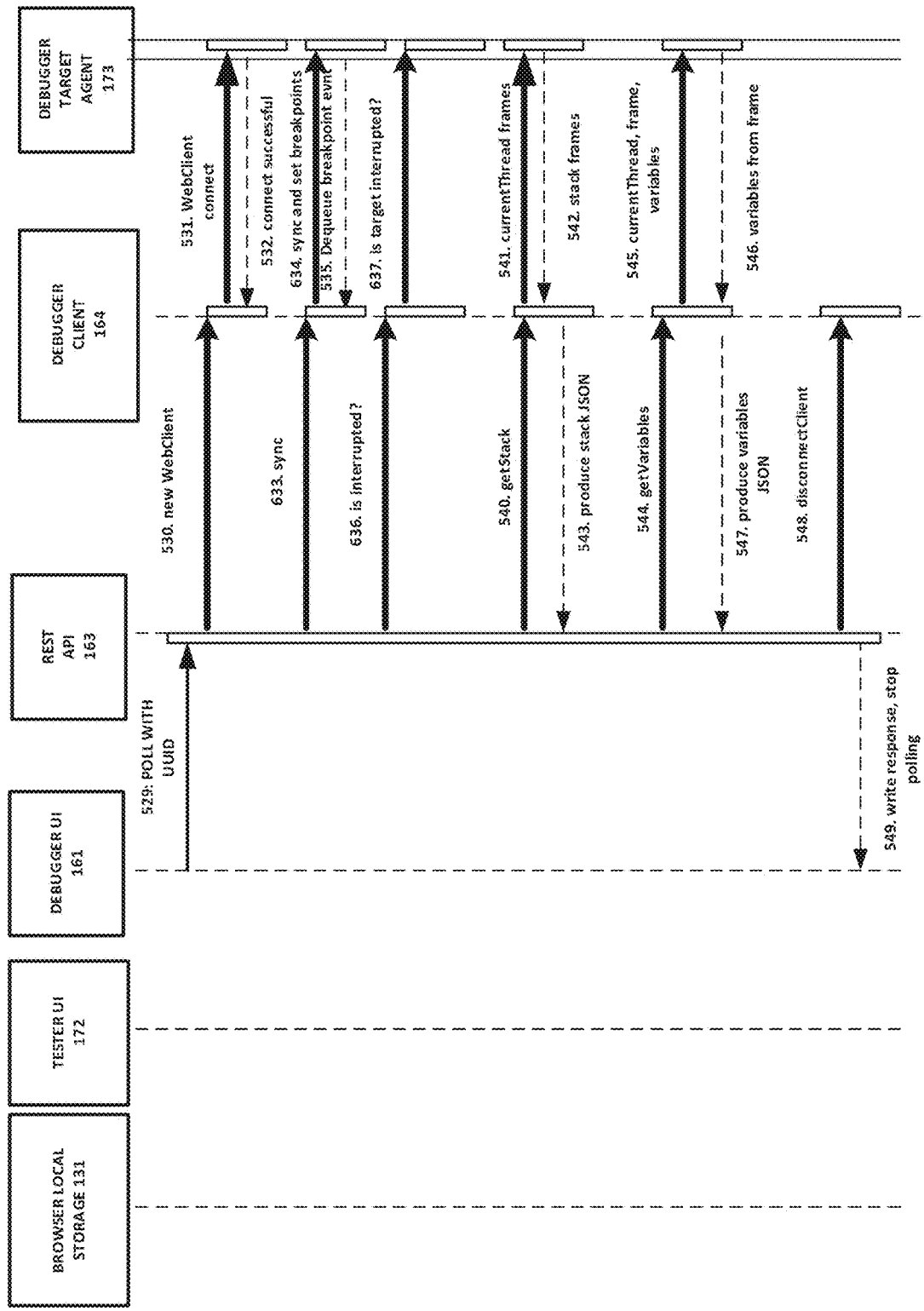

On sheet 12 of 16, in FIGURE 6C, under Reference Numeral 535, Line 1, delete "evnt" and insert -- event --, therefor.

Figure 6D:
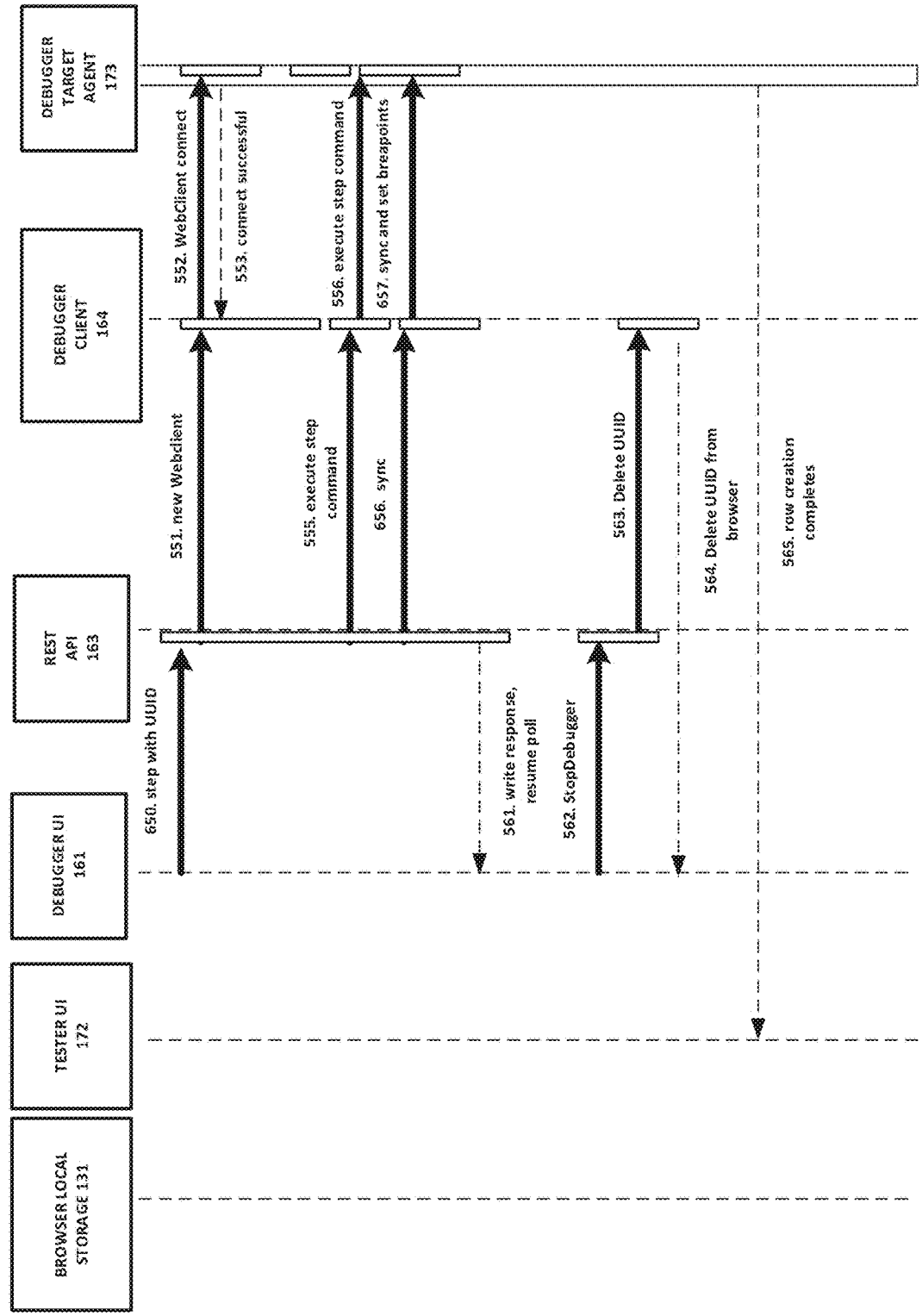

On sheet 13 of 16, in FIGURE 6D, under Reference Numeral 657, Line 1, delete "breapoints" and insert -- breakpoints --, therefor.

In the Specification

In Column 2, Line 12, after "resides" delete "in".

In Column 5, Line 65, delete "in in" and insert -- in --, therefor.

In Column 9, Line 54, delete "performed" and insert -- performed. --, therefor.

In Column 11, Line 26, delete "(JDPA)." and insert -- (JPDA). --, therefor.

In Column 11, Line 29, delete "JDPA" and insert -- JPDA --, therefor.

In Column 13, Line 43, delete "performed" and insert -- performed. --, therefor.

In Column 13, Line 56, delete "JDP" and insert -- JPDA --, therefor.

In Column 13, Lines 65-66, delete "isInterrupted" and insert -- is Interrupted --, therefor.

In Column 15, Line 31, delete "begins" and insert -- begins. --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,866,884 B2

In Column 19, Line 53, delete "C #," and insert -- C#, --, therefor.

In Column 19, Line 59, after "can" insert -- be --.